United States Patent [19]
Yamauchi et al.

[11] Patent Number: 5,648,919
[45] Date of Patent: Jul. 15, 1997

[54] MAINTENANCE SYSTEMS FOR DEGRADATION OF PLANT COMPONENT PARTS

[75] Inventors: Kiyoshi Yamauchi; Takenori Shindo, both of Kure; Shigeo Hattori, Hitachi, all of Japan

[73] Assignees: Babcock-Hitachi Kabushiki Kaisha; Hitachi, Ltd., both of Tokyo, Japan

[21] Appl. No.: 195,021

[22] Filed: Feb. 14, 1994

[30] Foreign Application Priority Data

| Feb. 15, 1993 | [JP] | Japan | 5-025633 |
| Feb. 19, 1993 | [JP] | Japan | 5-030863 |
| Feb. 22, 1993 | [JP] | Japan | 5-032059 |

[51] Int. Cl.$^6$ .................................................. G05B 17/00
[52] U.S. Cl. ............................................ 364/578; 395/912
[58] Field of Search .................................. 364/578, 492, 364/184; 395/912, 68, 500

[56] References Cited

U.S. PATENT DOCUMENTS

| Re. 33,162 | 2/1990 | Yoshida et al. | 364/492 |
| 5,027,268 | 6/1991 | Sakurai et al. | 364/184 |
| 5,315,502 | 5/1994 | Koyama et al. | 364/184 |
| 5,331,579 | 7/1994 | Maguire, Jr. et al. | 364/578 |

FOREIGN PATENT DOCUMENTS

| 63-19838 | 4/1988 | Japan . |
| 63-231298 | 9/1988 | Japan . |
| 64-84189 | 3/1989 | Japan . |
| 64-84192 | 3/1989 | Japan . |
| 1-102396 | 4/1989 | Japan . |
| 1-127999 | 5/1989 | Japan . |
| 2-25435 | 6/1990 | Japan . |
| 3-55403 | 3/1991 | Japan . |
| 3-146897 | 6/1991 | Japan . |
| 4-305155 | 10/1992 | Japan . |

OTHER PUBLICATIONS

J.N. Kass et al, "Comparative Stress Corrosion Behavior of Welded Austenitic Stainless Steel Pipe in High Temperature High Purity Oxygenated Water", Corrosion–Nace, vol. 36, No. 12, pp. 686–698.

Paper of R. Post et al, "Statistical Approach to Qualify Countermeasures", Paper No. 15 (no date), pp. 1–1–6–2.

*Primary Examiner*—Emanuel T. Voeltz
*Assistant Examiner*—Thomas Peeso
*Attorney, Agent, or Firm*—Fay, Sharpe, Beall, Fagan, Minnich & McKee

[57] ABSTRACT

A system of preventive maintenance for plant component parts correlates parameters for determining the transition probability distribution of degradation phenomena, selects an arbitrary influencing factor with respect to each of various influencing factors of the degradation phenomena, selects one of the parameters for the transition probability distribution as a first function, and sets the transition probability distribution when the variables of various influencing factors are reference degree values of a reference system. The system computes a ratio between the first function and the parameter value in the reference system to give a function of the subdivided index of degradation of the influencing factor, multiplies the subdivided index of degradation of various influencing factors by a unit conversion and a coefficient for reliability.

9 Claims, 25 Drawing Sheets

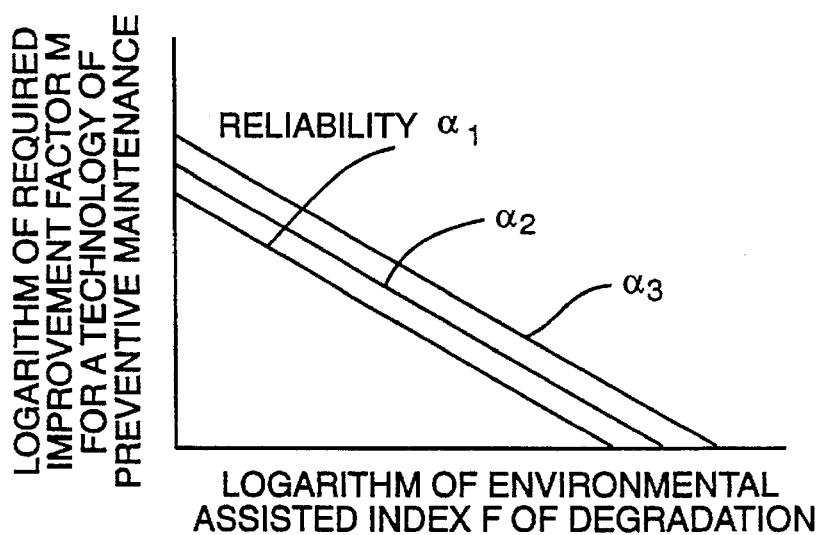
FIG. 14
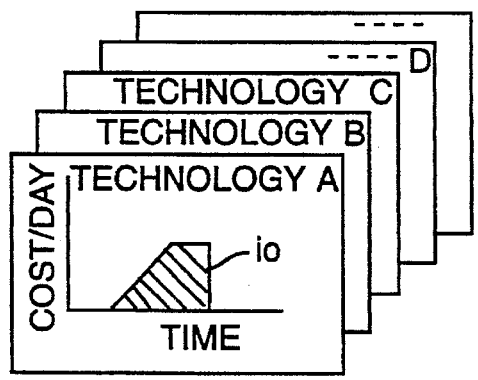
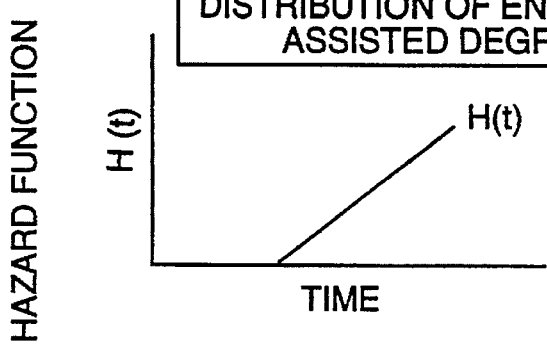
FIG. 15

FIG.20

| NAME OF PLANT | NO. | NAME OF POSITION | MATERIAL FACTOR | | HEAT TREATMENT FACTOR | | STRESS FACTOR | ENVIRONMENTAL FACTOR | | | KINDS OF MATERIALS | 316NG | F VALUE |
|---|---|---|---|---|---|---|---|---|---|---|---|---|---|
| | | | CARBON CONTENT | N VALUE | LOW TEMPERATURE AGING | STRESS RELIEF ANNEALING | EFFECTIVE STRESS | EFFECTIVE OXYGEN CONTENT | CREVICE | CONDUC-TIVITY | | | |
| | | | X1 | X2 | X3 | X4 | X5 | X6 | X7 | X8 | | | |
| A | 1 | a1 | 0.05 | -1 | -1 | -1 | 0.98 | 280 | 1 | 0.1 | 1 | -1 | 50 |
| A | 2 | a2 | 0.05 | 6 | -1 | 1 | 0.67 | 270 | -1 | 0.1 | -1 | -1 | 105 |
| C | 3 | c1 | 0.015 | -1 | -1 | -1 | 0.92 | 320 | -1 | 0.1 | 1 | 1 | >200 |
| D | 4 | d1 | 0.07 | -1 | -1 | 1 | 0.95 | 290 | -1 | 0.1 | 1 | -1 | 11 |
| D | 5 | d2 | 0.06 | 1 | -1 | -1 | 1.1 | 310 | -1 | 0.1 | -1 | -1 | 17 |
| D | 6 | d3 | 0.06 | -1 | -1 | -1 | 0.93 | 310 | -1 | 0.1 | 1 | -1 | 29 |
| E | 7 | e1 | 0.06 | -1 | -1 | -1 | 1.1 | 320 | -1 | 0.1 | 1 | -1 | 13 |
| F | 8 | f1 | 0.05 | -1 | -1 | -1 | 1.1 | 290 | -1 | 0.1 | 1 | -1 | 90 |

| NAME OF PLANT | NO. | NAME OF POSITION | MATERIAL FACTOR | | HEAT TREATMENT FACTOR | | STRESS FACTOR | ENVIRONMENTAL FACTOR | | | KINDS OF MATE-RIALS | 316NG | F VALUE |
|---|---|---|---|---|---|---|---|---|---|---|---|---|---|
| | | | CARBON CONTENT | N VALUE | LOW TEMP-ERATURE AGING | STRESS RELIEF ANNEALING | EFFECTIVE STRESS | EFFECTIVE OXYGEN CONTENT | CREVICE | CONDUC-TIVITY | | | |
| | | | X1 | X2 | X3 | X4 | X5 | X6 | X7 | X8 | | | |
| A | 1 | a1 | 0.05 | -1 | -1 | -1 | 0.98 | 10 | 1 | 0.1 | 1 | -1 | >200 |
| A | 2 | a2 | 0.05 | 6 | -1 | 1 | 0.67 | 10 | -1 | 0.1 | -1 | -1 | >200 |
| C | 3 | c1 | 0.015 | -1 | -1 | -1 | 0.92 | 20 | -1 | 0.1 | 1 | 1 | >200 |
| D | 4 | d1 | 0.07 | -1 | -1 | 1 | 0.95 | 5 | -1 | 0.1 | 1 | -1 | >200 |
| D | 5 | d2 | 0.06 | 1 | -1 | -1 | 1.1 | 15 | -1 | 0.1 | -1 | -1 | >200 |
| D | 6 | d3 | 0.06 | -1 | -1 | -1 | 0.93 | 10 | -1 | 0.1 | 1 | -1 | >200 |
| E | 7 | e1 | 0.06 | -1 | -1 | -1 | 1.1 | 10 | -1 | 0.1 | 1 | -1 | >200 |
| F | 8 | f1 | 0.05 | -1 | -1 | -1 | 1.1 | 15 | -1 | 0.1 | 1 | -1 | >200 |

| NAME OF PLANT | POSITION OF PLANT COMPONENT | EVALUATION OF FIELD INCIDENT | EVALUATION OF DEGRADATION POTENTIAL | | EVALUATION OF INSPECTION | | | |
|---|---|---|---|---|---|---|---|---|
| | | | DEGRADATION FACTOR | | TECHNOLOGY OF INSPECTION | | | |
| | | | F VALUE OF IGSCC | EVALUATION OF DEGRADATION | VT | ET | PT | UT |
| A | a1 | ● | 11 | 1 | ● | ● | ● | ● |
| A | a2 | ○ | 19 | 2 | ● | ● | ● | ● |
| A | a3 | ○ | 41 | 5 | ○ | ○ | ○ | ○ |
| B | b1 | ● | >50 | 6 | ● | ● | ● | ● |
| B | b2 | ● | 28 | 3 | ● | ● | ● | ● |
| B | b3 | ○ | 38 | 4 | ● | ● | ● | ● |
| B | b4 | ○ | 49 | 5 | ○ | ○ | ○ | ○ |
| C | c1 | ○ | >50 | 6 | ● | ● | ● | ● |
| C | c2 | ○ | >50 | 6 | ● | ● | ● | ● |
| D | d1 | ○ | 20 | 3 | ○ | ○ | ○ | ○ |
| D | d2 | ● | 9 | 1 | ● | ● | ● | ● |
| D | d3 | ○ | 32 | 4 | ● | ● | ● | ● |
| E | e1 | ○ | >50 | 6 | ● | ● | ● | ● |
| E | e2 | ○ | >50 | 6 | ● | ● | ● | ● |
| F | f1 | ○ | >50 | 6 | ● | ● | ● | ● |
| G | g1 | ○ | >50 | 6 | ● | ● | ● | ● |
| G | g2 | ○ | 38 | 4 | ○ | ○ | ○ | ○ |
| G | g3 | ○ | >50 | 6 | ● | ● | ● | ● |

| NAME OF PLANT | POSITION OF PLANT COMPONENT | TECHNOLOGY EVALUATION OF PREVENTIVE MAINTENANCE | | | | TECHNOLOGY EVALUATION OF PREVENTIVE MAINTENANCE | | | | | EVALUATION OF PREPARATION FOR PREVENTIVE MAINTENANCE |
|---|---|---|---|---|---|---|---|---|---|---|---|
| | | EVALUATION OF A TECHNOLOGY OF PREVENTIVE MAINTENANCE | | | | | | | | | |
| | | HYDROGEN INJECTION | REPLACE-MENT | WJ | BUTTERING | IHSI | LASER | SHIF | IMPROVED SHIFT | | |
| A | a1 | ○ | ○ | ○ | ○ | — | ○ | ○ | ○ | | HWC+SHIFT |
| A | a2 | ○ | ○ | ○ | ○ | ○ | ○ | ○ | ○ | | HWC+WJ |
| A | a3 | ○ | — | ○ | — | — | — | — | — | | HWC |
| B | b1 | ○ | ○ | ○ | — | — | — | — | — | | — |
| B | b2 | ○ | ○ | ○ | — | — | ○ | ○ | ○ | | HWC+WJ |
| B | b3 | ○ | ○ | ○ | — | ○ | — | — | ○ | | HWC |
| B | b4 | ○ | — | ○ | — | — | — | — | ○ | | HWC |
| C | c1 | ○ | ○ | ○ | — | — | — | — | — | | — |
| C | c2 | ○ | — | ○ | — | ○ | ○ | ○ | ○ | | HWC+IHSI |
| D | d1 | ○ | ○ | ○ | ○ | ○ | — | ○ | ○ | | HWC+REPLACEMENT |
| D | d2 | ○ | ○ | ○ | — | — | ○ | ○ | ○ | | HWC+WJ |
| D | d3 | ○ | — | ○ | — | ○ | ○ | — | ○ | | — |
| E | e1 | ○ | ○ | ○ | — | — | — | — | — | | — |
| E | e2 | ○ | ○ | ○ | — | — | — | — | — | | — |
| F | f1 | ○ | ○ | ○ | ○ | — | ○ | ○ | ○ | | — |
| G | g1 | ○ | ○ | ○ | — | — | — | ○ | ○ | | — |
| G | g2 | ○ | ○ | ○ | — | — | ○ | ○ | ○ | | — |
| G | g3 | ○ | ○ | ○ | — | — | ○ | ○ | ○ | | — |

FIG. 23

MAINTENANCE SYSTEMS FOR DEGRADATION OF PLANT COMPONENT PARTS

FIELD OF THE INVENTION

The present invention relates to a method of improvement of reliability for nuclear plants, thermal electric power plants, chemical plants, etc., a method of their operation control and a control device, and their system.

Specifically, it relates to a method of preventive maintenance for the plant components, a method of improvement of reliability of the plant components for constructing the plant which improves the reliability of the plant components, and a method of operation control for the plants and their control device and system by preventing degradation such as a stress corrosion cracking (which will be abbreviated as a SCC thereafter) of an environmental assisted degradation.

DESCRIPTION OF THE RELATED ART

It has been desired previously to establish the technology of prediction, a selection method of maintenance for preventing the degradation of the material of components in an industrial plant, such as the degradation of the component parts in a specific operating plant or plant under design or construction, for preventing SCC and a direction to the optimal development of preventive maintenance.

In other words, it is desired to establish an evaluation method for being capable of quantitatively extracting the potential point of SCC for every position of the plant component for the preventive maintenance of SCC in the material of component. It is also necessary to establish a technology of evaluation which can be made use of as a technical specification at the designing and preparing stages of a new plant and which can exactly exclude some points having the possibility of generation of SCC.

Therefore, of all technologies of stress corrosion cracking (SCC) in reliability engineering, as a prior art, a theory of the factors of improvement has given its remarkable contribution to the verification to 316 (316NG) steel for nuclear energy utilization [R. Post and J. LeMaire: Statistical Approach to Qualify Countermeasure; Proceeding Seminar on Countermeasure for BWR Cracking: Jan. 22–24, 1980 EPRI-WS'-174 (1980)].

In the disclosure of Japanese Pat. Laid Open Pub. No. 3-55403, there is known a method of preventive maintenance which evaluates the residual life of a plant component, resulting in determining the inspection items at the next time and arranging remedy, replacement and reconstruction. At this time, the residual life of a plant component is evaluated on the basis of the reference state, i.e., creep, fatigue and oxides. However, SCC has not yet been taken into consideration.

Also, another method of evaluation of residual life is disclosed in Japanese Pat. Laid Open Pub. No. 3-146897, and this disclosure is intended to be applied to the carbon seal of CRD. A residual life can be computed by taking temperature as a parameter, obtaining the characteristics of time-dependent degradation indicating each bend strength from operating data and accelerated test data, and determining the resulting time up to the limit of degradation. However, no environmental degradation, e.g., SCC, has been taken into consideration.

However, this theory of the factors of improvement is an evaluation technology of improvement factor of SCC of an evaluation life system against the reference life system in the case of keeping the values of variables of other influencing factors with the same condition in both systems by aiming at only one of various influencing factors on SCC. Since each influencing factor on SCC is different in values of variables from each other, depending on the comparing factors (i.e., reference life system) and the factors to be compared (i.e., evaluation life system) in the case of each position in a plant component, it is impossible to compare the residual life in the evaluation system with that in the reference system, and another theory is required.

As a technology for satisfying this demand, the present applicant previously proposed a method of evaluation for the characteristic reliability of the material of a component (Japanese Pat. Laid Open Pub. No. 4-305455). In this invention, there are shown an equation totally incorporating each influencing factor on SCC and each evaluation index on the basis of accelerated test data.

However, in the case of applying a life prediction equation of degradation obtained in laboratory to an actual field life prediction of degradation in the preventive maintenance of degradation of component parts in an operating plant or plant under design or construction, no evaluation has been made about whether or not the file phenomena of the degradation in actual plants belong to the same category with those of the degradation obtained by an acceleration experiment in laboratory.

For the preventive maintenance of degradation in actual plants, it is necessary to evaluate the life phenomena of the degradation in the material of a component in relation with its transition probability distribution or hazard function. In the proposal described above, however, no consideration has been taken in this respect.

Furthermore, a method theory or system for determining the application of the technologies of preventive maintenance by predicting the transmission probability of the degradation and further, a relation with their profitability have not yet been clarified.

Also, a method for obtaining the residual life in the above-mentioned Japanese Pat. Laid Open Pub. No. 3-146897 becomes complicated and cannot correspond to the complex phenomena, such as SCC and others, which are due to the combination of many influencing factors.

On the other hand, the evaluation method developed by the present inventors can handle many influencing factors and be used in combination with a prior art evaluation of residual life.

However, as a result of examining this method of evaluation, which can handle many influencing factors, with respect to the plant components, it has been found that there is a need of improving the reliability of components more positively even for new plant components, and that if this method of evaluation is used quickly, the evaluation of the components can be carried out effectively.

For preventing the environmental assisted cracking of the material of a component by a method of operation control for a plant, there are written proposals, e.g., Japanese Patent Publication Nos. 63-19838 and 2-25435, and Japanese Pat. Laid Open Pub. Nos. 63-231298, 64-84189, 64-84192 and 1-102396.

In a prior art proposal with regard to plant operation methods, there are also the following problems as a whole.

(1) For the prevention of an environmental assisted cracking, a relation between a stress corrosion cracking as an estimate in the case of controlling a hydrogen injection content and a dissolved oxygen content or between the prevention of a stress corrosion cracking and its corrosion potential, is based on the experimental data obtained by accelerating the sensitization of stress and material thereof, while using a test piece.

Therefore, an amount of hydrogen injection often becomes too excessive to the potential point of the stress corrosion cracking in the plant. Therefore, it cannot be an optimal control of hydrogen injection.

(2) Under the environmental restriction on the basis of the proposal described in the prior art, for instance, it however is possible to have an excess control operation in the case that the dissolved oxygen content becomes 60 ppb or that the corrosion potential becomes −230 mV or more, a large quantity of hydrogen will have to be injected.

The plants including the presently available ones are operated at their dissolved oxygen content in the range of 180–300 ppb and at the corrosion potentials from 0 to +10 0 mV (refer to Japanese Pat. Laid Open Pub. No. 1-127999) and these plants have been used for approximately 20 years.

An excess control operation can be easily done because these regulated conditions are incomplete, in the case that hydrogen is injected when a dissolved oxygen content and the corrosion potential exceed each standard value.

(3) It is necessary to attempt the optimization of the control of a hydrogen injection content to the restriction of radioactive nitrogen oxides toward the side of the turbine using some technologies.

SUMMARY OF THE INVENTION

A main object of the present invention is to provide a system for predicting a transition probability distribution of the degradation phenomena in a component part from the correlation between parameters for determining the distribution of transition probability of degradation, and for planning, preparing and applying a maintenance technology thereof. In further improving upon the previous proposal, a further object of this invention is to provide a method of operation control for plants and their control device for the above system.

For attaining the objects described above, the present invention comprises the following steps:

(1) knowing the degree of each influencing factor on the degradation, such as an environmental assisted degradation on the positions of the component parts in a specific plant or plant under design or construction; and/or (2) obtaining the information for the analysis of the transition probability distribution of the degradation phenomena and the information on the degree of each influencing factor for the preventive maintenance of degradation of the parts in a specific plant or plant under design or construction, at least from field incident information, inspection information, preventive maintenance information and monitoring information;

(3) computing a correlation between the parameters for determining the transition probability distribution of the degradation phenomena from laboratory data and actual plant data;

(4) making the degrees of other influencing factors constant by aiming at an arbitrary influencing factor among the influencing factors of the degradation phenomena described above;

(5) giving the dimension of the aimed influencing factor as a variable and selecting one of a plurality of parameters for determining the transition probability distribution described above;

(6) expressing this selected parameter as a first function;

(7) determining the reference degree of each influencing factor;

(8) giving the transition probability distribution of the degradation phenomena as a reference system when the variable of each influencing factor is the reference value described above;

(9) knowing a value of the selected parameter described above for determining the transition probability distribution in the reference system;

(10) computing the ratio between the first function described above and the value of the selected parameter described above and giving the ratio as a function of the subdivided index of degradation of the aimed influencing factor;

(11) multiplying the product of the subdivided index of degradation of each influencing factor described above with a unit conversion or coefficient of reliability, and giving the resulting product as an index of degradation which indicates the possibility for the possible phenomena described above;

(12) using the correlation between the index of degradation and the selected parameter described above for determining the transition probability distribution of the degradation phenomena with reference to many systems of degradation phenomena;

(13) determining the value of the selected parameter described above for determining the transition probability distribution of the degradation phenomena from the value of a variable for the degree of each influencing factor on the degradation phenomena in an evaluation system;

(14) further using the correlation between a plurality of parameters for determining the transition probability distribution of the degradation phenomena described above in the above description of (3);

(15) determining the value of the other parameter of the transition probability distribution of the degradation phenomena from the selected parameter described above for determining the transition probability distribution of the degradation phenomena in the evaluation system;

(16) estimating the transition probability distribution of the degradation phenomena in the evaluation system;

(17) predicting by a computation equation the possibility of the degradation phenomena at the positions of the component parts to become an evaluation system and determining the number of the year by the necessity or lack thereof of any preparation;

(18) providing a technology of the preventive maintenance of the positions of the component parts characterized by planning, preparing and applying the technology of preventive maintenance; and

(19) evaluating using an evaluation system of degradation comprising a memory, computation and display for planning, preparing, and applying the technology of preventive maintenance.

Specifically, the present invention comprises the following steps:

subdividing the present application technology for each position of a plant component into each influencing factor on the degradation;

inputting the values, in both of the present application technology described above and the reference technology, into each influencing factor thus subdivided;

obtaining the subdivided index of degradation with respect to each influencing factor of the present application technology on the basis of the input values of the reference technology;

computing each life index value of degradation by the product of the subdivided indices with each other with respect to each position of the plant component;

comparing the life index value of degradation of each position in the plant component with a predetermined value and extracting and outputting each position of the plant component indicating a smaller life index value of degradation than the predetermined value;

obtaining the subdivided index using each influencing factor of the technology described above by the input of each technology subdivided into each influencing factor with respect to each extracted position of the plant component and also the life index value of degradation of each position in the plant component by the product of the subdivided life indices of degradation with each other described above, comparing the life index value of degradation of each position in the plant component with a predetermined value and selecting a technology of improvement which adopts the life index value of degradation larger than the predetermined value; and obtaining and outputting an optimal technology while considering cost and other factors to the technology of improvement thus selected.

Furthermore, the present invention is characterized by the following means:

a method of analysis of the technology for subdividing a present application technology into each influencing factor with respect to each position in a plant component;

an input means for inputting the values of the present application technology described above and a reference technology with respect to each influencing factor thus subdivided;

an arithmetic means of the life index of degradation for obtaining a subdivided index with respect to each influencing factor on the basis of the values by the reference technology, and also an arithmetic means of the life index of degradation for obtaining a life index value of degradation by the product of the subdivided indices with respect to each position of a plant component with each other;

a discrimination means of the present technology for extracting a position of the plant component showing a smaller life index value than a predetermined value by comparing the life index value of degradation of each position in the plant component from the arithmetic means of life index of degradation with the predetermined value;

a discrimination means of the technology of improvement for inputting each technology subdivided into each influencing factor by the input means described above, obtaining a subdivided index using each influencing factor in each technology described above and also a life index value of degradation of each position in the plant component by the product of the subdivided indices with each other, with respect to each position in the plant component extracted by the discrimination means of the present technology, and for selecting a technology of improvement for taking a life index value of degradation exceeding a predetermined value by comparing the life index value of degradation of each position in the plant component with the predetermined value;

an evaluation means of optimal technology for obtaining an optimal technology while considering cost and other factors to the technology of improvement selected by the discrimination means of the technology of improvement; and an output means for outputting the results of both the discrimination means of the present technology and the evaluation means of optimal technology described above.

For solving the problem of a method of plant operation control for preventing the corrosion degradation of the material of a component, an overall index can be computed by the following steps:

making the degrees of other influencing factors constant while aiming at an arbitrary factor with respect to each influencing factor on the phenomena of the material of the component to obtain a first function between the dimension of the aimed influencing factor and the degree of the phenomena;

obtaining a second function of the degree of the phenomena when each influencing factor takes the reference value described above by determining the reference degree of each influencing factor;

giving a function of the subdivided index of the aimed influencing factor by computing the ratio between the first and second functions described above;

computing the possibility for the possible phenomena described above by multiplying the product of the function of the subdivided index of each influencing factor with a correction coefficient and obtaining no degradation zone from the correlation between this index and an environmental assisted cracking life of the material shown by Equation (1), namely:

$$F \geq h(t, r) \qquad (1)$$

wherein F is an index, t is time, r is a confidence level, and h is a function, respectively;

expressing the variable Xj of the dimension of the influencing factor as a function of time, in the case of considering at least one or more influencing factors in such a relation as to express the process condition of the index of the position itself of the plant component, namely: Xj(t);

giving the subdivided index Fj of the influencing factor as a function of its variable Xj(t), namely: Fj[Xj(t)]; and representing an overall index by Equation (2), namely:

$$F = \prod_{i=1}^{l} Fzi \times Fj[Xj(t)] \times \theta \prod_{\substack{i=0 \\ i \neq j}}^{n} Fi \qquad (2)$$

and computing its index by giving an intrinsic index of the position of the component which is based on a static data characteristic of the control object described above and by defining the subdivided intrinsic index of the component as a Fzi.

An environmental control operation is carried out so that each factor in the matrix of this index satisfies Equation (1) described above.

Furthermore, in the plant operation control device for preventing the corrosion degradation of the material of a component, the present invention comprises the following means:

each sensor for detecting the surrounding environment of the material of the component described above;

an input means for inputting information on the prevention of corrosion degradation of the material of the component; and a control means for computing and commanding on the basis of the input information by means of each sensor and the input means described above, while the control means comprises a control device carrying out the steps:

making the degree of other influencing factors constant while aiming at an arbitrary factor with respect to each influencing factor on the phenomena of the material of a component and obtaining a first function between the dimension of the aimed influencing factor and the degree of the phenomena;

obtaining a second function of the degree of the phenomena when each influencing factor takes the reference value described above by determining the reference degree of each influencing factor;

giving a function of the subdivided index of the aimed influencing factor by computing the ratio between the first and second functions described above;

computing the possibility for the generation of the phenomena described above by multiplying the product of the function of the subdivided index of each influencing factor with a correction coefficient and obtaining no degradation zone from the correlation between this index and an environmental assisted cracking life of the material shown by Equation (1), namely: $F \geq h(t, r)$, whereas F indicates an index, t is time, r a confidence level and h indicates a function, respectively;

expressing the variable Xj of the dimension of the influencing factor as a function of time, in the case of considering at least one or more influencing factors in such a relation as to express the process condition of the index of the position itself of the plant component, namely: $Xj(t)$;

giving the subdivided index Fj of the influencing factor as a function of its variable $Xj(t)$, namely: $Fj[Xj(t)]$; and representing an overall index by Equation (2), namely:

$$F = \prod_{i=1}^{l} Fzi \times Fj[Xj(t)] \times \Theta \prod_{\substack{i=0 \\ i \neq j}}^{n} Fi \quad (2)$$

and computing its index by giving an intrinsic index of the position of the component which is based on a static data characteristic of the control object described above and by defining the subdivided index characteristic of the component as a Fzi.

An environmental control operation is carried out so that each factor in the matrix of this index satisfies Equation (1) described above.

FUNCTION OF THE INVENTION

To know the information on the degree of each influencing factor on each position of the component parts for the preventive maintenance of degradation of the component parts in a specific operating plant or plant under design or construction in the above descriptions (1) and (2); or to obtain the information for the analysis of the transition probability distribution of the degradation phenomena and the information on the degree of each influencing factor, at least, from field incident information, inspection information, preventive maintenance information and monitoring information, for the preventive maintenance of degradation of the component parts in a specific operating plant or plant under design or construction;

means are provided to confirm a technology of prediction even for the data of an actual plant without predicting the transition probability phenomena of the degradation phenomena of the actual plant simply through experimental data, evaluate whether or not the life phenomena in degradation of the actual plant is in the same category with those obtained by an acceleration experiment in laboratory and to improve the precision in prediction.

The analysis of the degradation phenomena means that the transition probability distribution is analyzed by a model of transition probability. For example, as shown in FIGS. 1(a)-1(c), the life phenomena of SCC in high temperature water can often be analyzed by the following equation:

$$-dN/dt = k\,N \quad (3)$$

$$ln(N_0/N) = k(t - t_0) \quad (4)$$

$$<t> = t_0 + (1/k) \quad (5)$$

whereas, ln $(N_0/N)$: corresponds to a hazard function H(t)

N: number of samples for no SCC at a time t $N_0$: number of initial samples t: time In this case, the parameters for determining the transition probability distribution will be in the following three terms, namely:

$<t>$: mean time to SCC failure $t_0$: start time to SCC k: SCC reaction rate

FIGS. 2 and 3 are views showing the results obtained by clarifying the weld of stainless steel SUS 304 sensitized in high temperature water, the weldments of nickel base alloys 600·182 and the behavior of SCC life, and examining the correlation between the parameters of the transition probability distributions in many life systems.

This correlation can be used in the case of knowing another parameter in order to get the transition probability distribution when one parameter of transition probability distribution has been known. The index of degradation is constituted as follows:

As shown in FIG. 4, a life system $t_R$ in a reference life system is introduced and a ratio f of time between this and a life time t in an evaluation system is taken so as to express the sizes of the barometer in the transition probability distribution of the degradation phenomena using the sizes of the ratio f of time, for example the length of the life in the case of SCC. Therefore, this ratio f of time is defined as an index of degradation.

FIG. 4 illustrates why an index of degradation can be expressed as a product of the subdivided indices of degradation of each influencing factor with each other.

For example, in the case of trying to know the life ratio of an evaluation point vis a reference point, first of all, as shown in the figure, when the stress ratio is 1.75, a carbon content is reduced from 0.06% down to 0.04%. The resulting subdivided index of degradation for this carbon content is expressed as follows:

$$F_1 = t_1/t_R \quad (6)$$

When the carbon content is 0.04%, the resulting stress ratio is reduced to 1.20. At that time, the subdivided index of degradation is expressed as follows:

$$F_5 = t_5/t_1 \quad (7)$$

Therefore, the life ratio of each evaluation point vis the corresponding reference point is expressed as a product of the subdivided indices of degradation of both influencing factors, namely:

$$f = F_1 \cdot F_5 \quad (8)$$

$$\therefore F = \Theta f = \Theta F_1 \cdot F_5 \quad (9)$$

whereas $\Theta$ is a unit conversion or coefficient for reliability.

If generalized and described, an index of degradation can be expressed as a product of the subdivided indices of degradation of each influencing factor with each other.

$$F = \Theta \cdot (t_r/t_{n-1}) \cdot (t_{n-1}/t_{n-2}) \ldots (t_3/t_2) \cdot (t_2/t_1) \cdot (t_1/t_R) \quad (10)$$

If each influencing factor is independent from each other, this equation is expressed as follows:

$$F = \Theta \cdot (t_n/t_R) \cdot (t_{n-1}/t_R) \ldots (t_3/t_2) \cdot (t_2/t_1) \cdot (t_1/t_R) \quad (11)$$

Furthermore, when a part of the influencing factors is not independent from the others, the equation is expressed as follows:

Therefore, when the term of $(t_i/t_{i-1})$ is placed to be equal to $F_i$, the index of degradation is expressed as follows:

$$F = \Theta \prod F_i \quad (12)$$

FIG. 5 is a view showing the case of aiming at two influencing factors within the index of degradation and three-dimensionally illustrating the subdivided index of degradation in the case that each index with respect to the variables of these factors is separable from the others. Since the vertical axis represented by a product between two subdivided indices is expressed in a logarithmic scale, the height of each evaluation point vs that of each reference point 0 can be drawn in the form of the logarithmic sum of each subdivided index of degradation and an arbitrary evaluation point is expressed on a curved surface.

FIG. 6 shows that a product between two indices can be represented by a logarithmic sum of each subdivided index of degradation with each other. This can be understood from the ratio f of time between the times from a reference point R to another point M and from the point M to an evaluation point E.

Now, the above description will be summarized in the following.

(a) To make the degree of the other influencing factor constant by aiming at an arbitrary influencing factor with regard to each influencing factor of the degradation phenomena described above;

(b) to give the degree of the aimed influencing factor as a variable and select one of the parameters for determining the transition probability distribution described above;

(c) to express the selected parameter as a first function;

(d) to determine the reference degree of each influencing factor determined;

(e) to give the transition probability distribution of the degradation phenomena as a reference system when the variable of each influencing factor is the reference value described above;

(f) to know the value of the selected parameter described above for determining the transition probability distribution in the reference system;

(g) to compute the ratio between the first function described above and the value of the selected parameter described above and give the ratio as a function of the subdivided index of degradation of the aimed influencing factor; and (h) to multiply the product of the subdivided index of degradation of each influencing factor described above with each other by a unit conversion or coefficient for reliability and give the resulting product as an index of degradation which indicates the possibility for the generation of the phenomena described above. The index of degradation expresses the improvement factor of life at the position to a reference life system, which gives each influencing factor on the environmental assisted cracking, as a parameter of the transition probability of degradation.

For constituting the correlation between the index of degradation and the parameter of the transition probability distribution of degradation in many systems of the degradation phenomena, it is arranged so as to determine the value of $\Theta$ for considering a predicted reliability on the basis of the predicted data in many systems, and enable to determine one of the parameters of the transition probability of the degradation phenomena from the index of degradation, only by giving the degree of the influencing factor in an evaluation system.

In other words, it is arranged so as to determine the values of the selected parameters for determining the transition probability distribution of the degradation phenomena from the values of the degree variables of the influencing factor on the degradation phenomena in an evaluation system.

It is arranged so as to determine the values of other parameters of the transition probability distribution of the degradation phenomena from the values of the selected parameters described above for determining the transition probability distribution of the degradation phenomena in an evaluation system, using the correlation described above between the parameters for determining the transition probability distribution of the degradation phenomena in the effects of the present invention described above.

It is arranged so as to estimate the transition probability distribution and the hazard function of the degradation phenomena in an evaluation system.

It is arranged so as to obtain the transition probability distribution and the hazard function described above for the degradation phenomena at the position of the component part to become an evaluation system, and then, know the degree of the possibility of degradation in the component part based on this knowledge, resulting in determining the necessity or lack thereof of any preparation, and the number of years until that time.

Considering both the index of degradation as an index of technology relating to the application of the preventive maintenance, and the transition probability distribution of the expenses for a technology of maintenance, it is possible to introduce an index of expense for the optimization of preventive maintenance.

Some computers are used as an evaluation system of degradation consisting of memory, computation, and display, for making it possible to automatically compute. They are further effective as an evaluation system when connected to a monitoring system for an actual plant, if necessary. The operation control for plants is thereby carried out, and as a result, the control for the prevention of the environmental assisted cracking of materials is more optimized.

BRIEF DESCRIPTION OF THE DRAWINGS

FIG. 14 is a view showing an index of cost on the basis of the predicted transition probability distribution and the transition probability distribution of cost as a preferred embodiment of the present invention;

FIG. 15 is an explanatory view showing a computation method for required improvement factor of the technology of preventive maintenance to degradation;

FIG. 20 is a table showing each influencing factor to the positions of each plant component and each value of F as a life index of degradation;

FIG. 21 is a table showing each influencing factor to the positions of each plant component and each value of F as a life index of degradation;

FIG. 22 is a table showing an evaluation of degradation potential and an inspection evaluation for the positions of each plant component;

FIG. 23 is table showing a technology of preventive maintenance and an evaluation for the necessity of preparation of remedy;

(Explanation of Reference Characters)

1: software for the preventive maintenance of degradation,
2: data of laboratory and actual plant,
3: monitoring device of actual plant,
4: input unit,
5: arithmetic zone,
6: display zone,
7: memory zone,
8: data transmission zone,
9: output zone,
10: instruction for the design, preparation and inspection of the technology of preventive maintenance
1': data base
2': means for technology and analysis
3': input means
4': computation means
5': discrimination means
6': output means
7': discrimination means for a technology of improvement
8': evaluation means for an optimal technology
9': operation of preparation
10': follow-up data
11': discrimination means based on the correlation of degradation of plant components
1": reactor pressure vessel
10": recirculation system
12", 18, 19: sensor group
13": reactor cleaning system
14": hydrogen gas, NOx source
15": gas injection control system
16": main body of control system
17": information converter
20": dosimeter
21": input unit

DESCRIPTION OF THE PREFERRED EMBODIMENTS

Example 1

Figure 9:
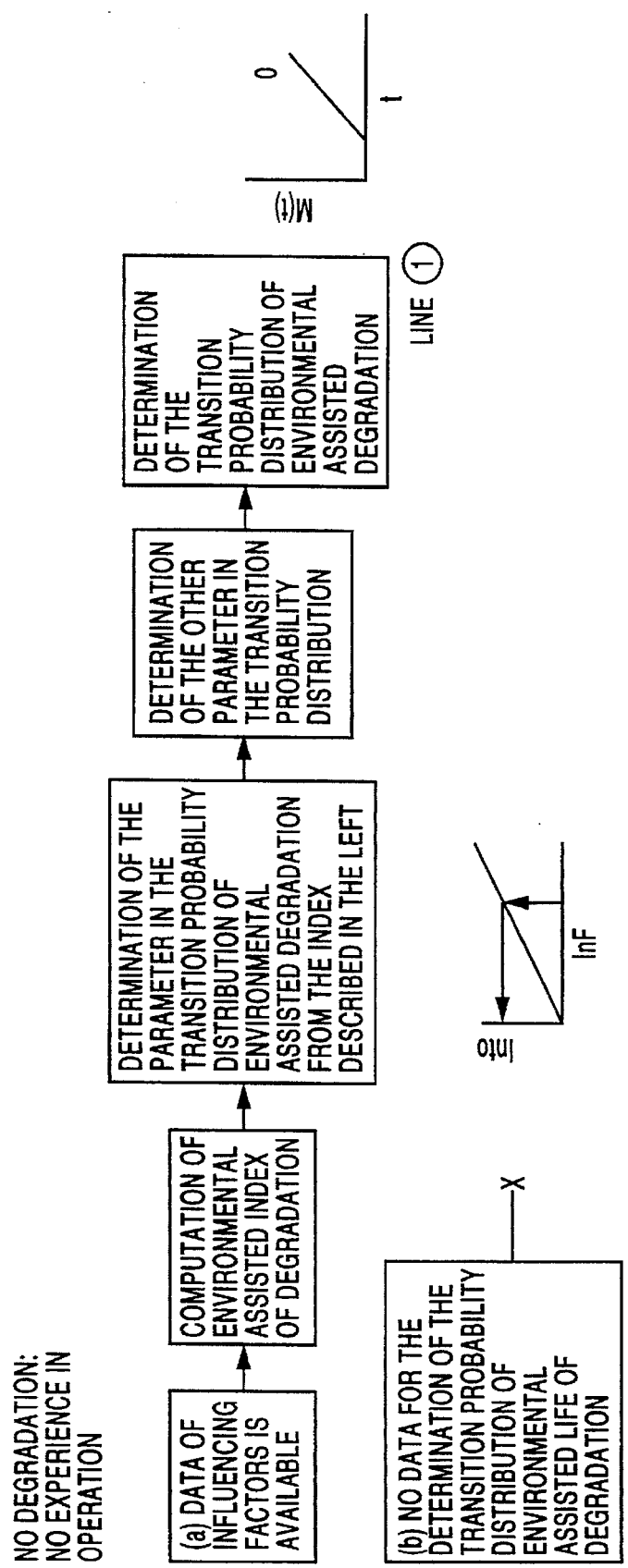
FIG. 9 is a flowchart showing a computation and evaluation for the prediction of the transition probability distribution of degradation phenomena and the evaluation of the technology of preventive maintenance.
Figure 10:
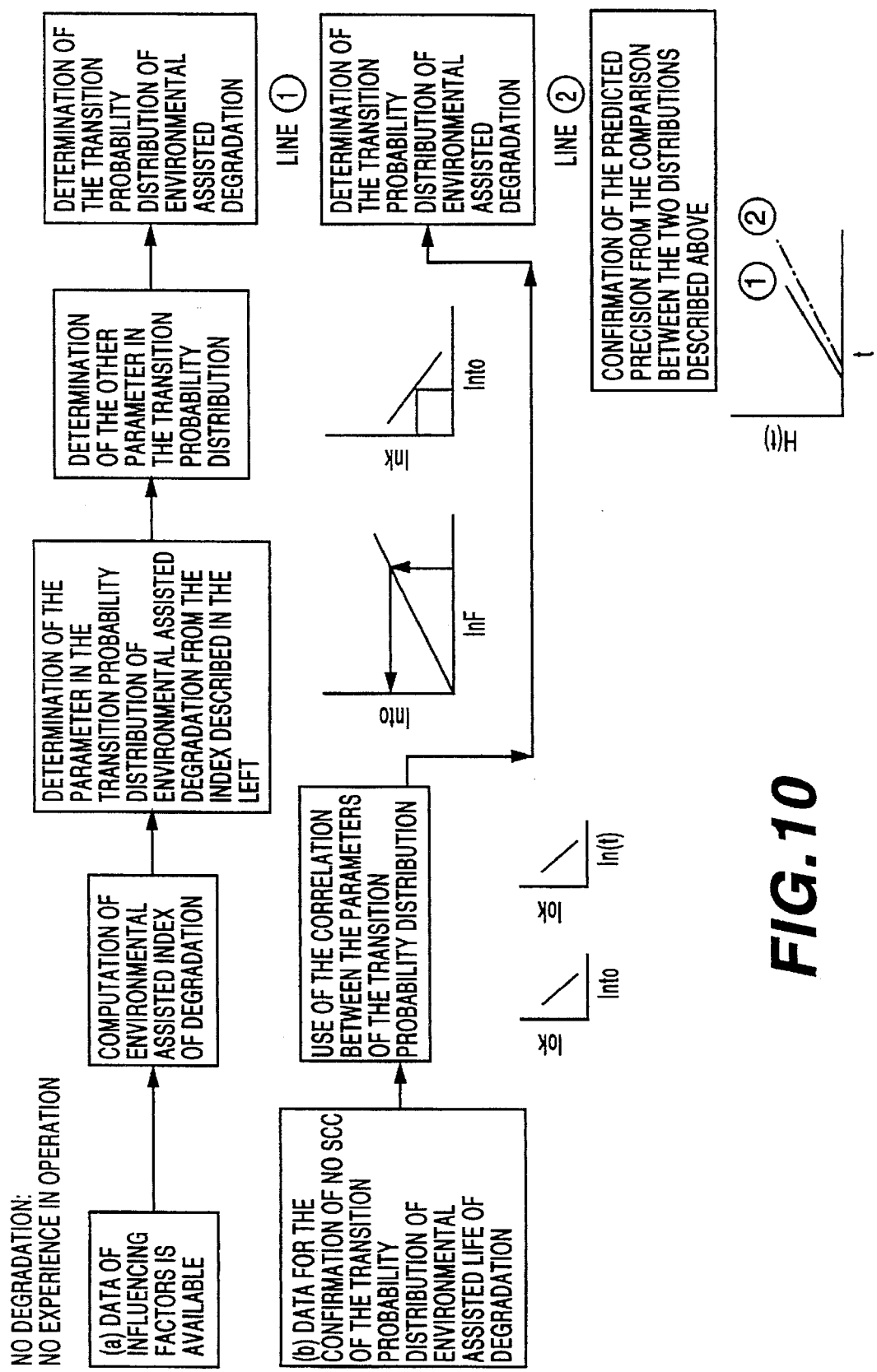
FIG. 10 is a flowchart showing a computation and evaluation for the prediction of the transition probability distribution of degradation phenomena and the evaluation of the technology of preventive maintenance.
Figure 11:
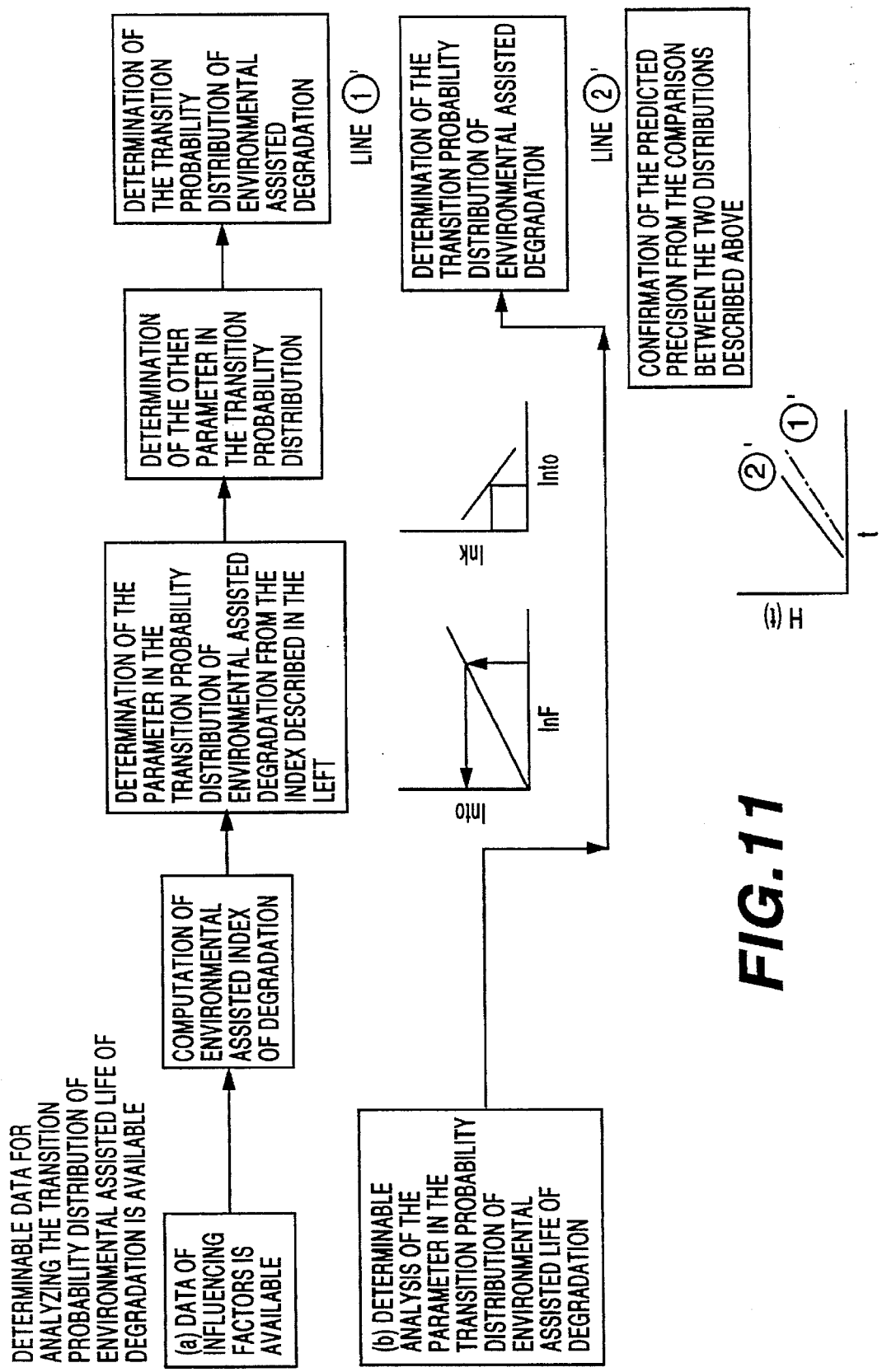
FIG. 11 is a flowchart showing a computation and evaluation for the prediction of the transition probability distribution of degradation phenomena and the evaluation of the technology of preventive maintenance.
Figure 12:
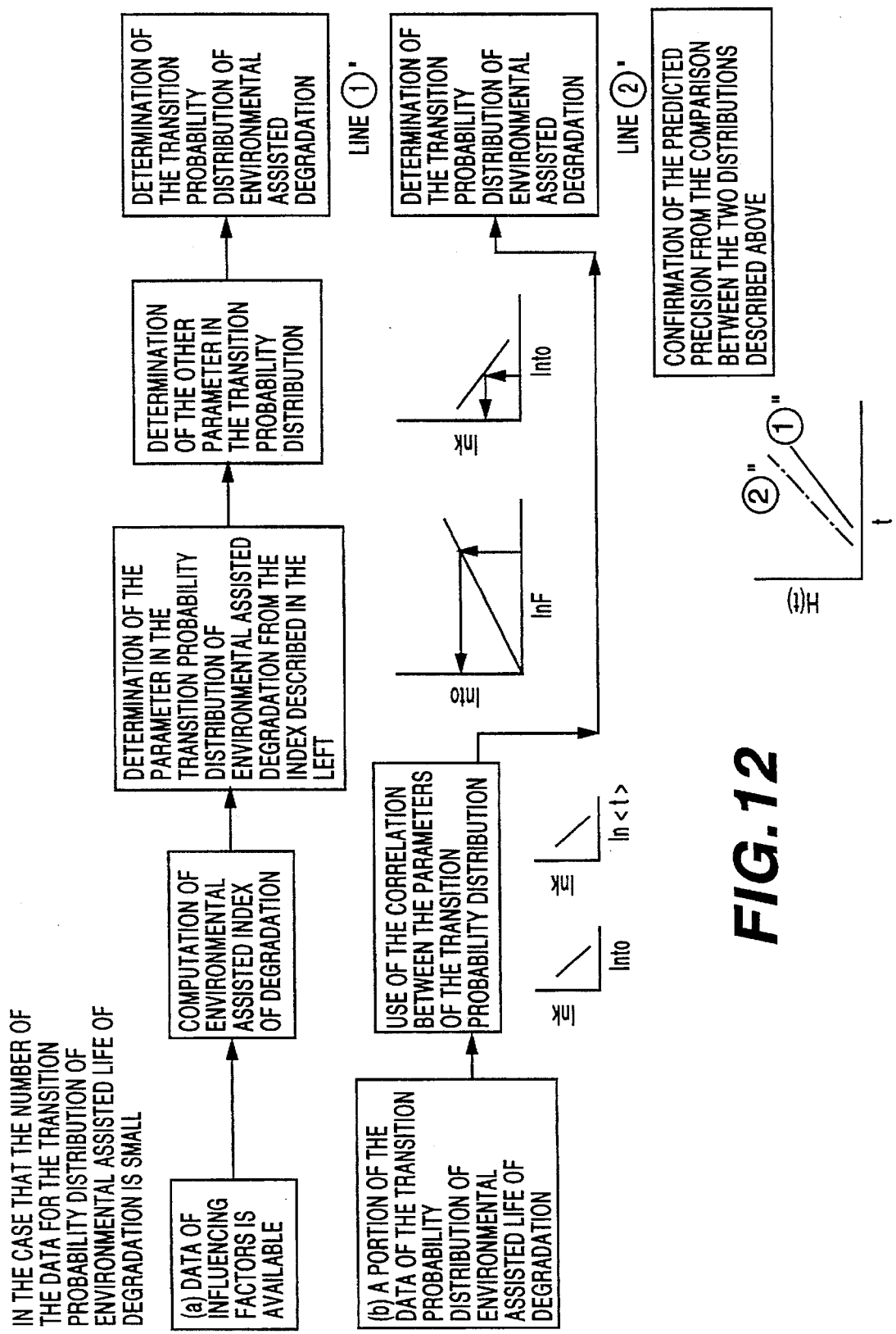
FIG. 12 is a flowchart showing a computation and evaluation for the prediction of the transition probability distribution of degradation phenomena and the evaluation of the technology of preventive maintenance.

The details of each process will specifically be explained along with the drawings in the following. FIGS. 7 through 12 show what is illustrated with reference to the computing process and they are a prediction of the transition probability distribution of degradation phenomena and a flowchart of the process for carrying out an evaluation of preventive maintenance based on the prediction thereof. FIG. 9 is a flowchart in the case that all parts of a plant component have no degradation and there is no experience in operation. FIG. 10 is a flowchart in the case that all parts of a plant component have no degradation and there is experience in operation. FIG. 11 is a flowchart in the case that there are determinable data in the analysis of the transition probability distribution of the time to degradation. FIG. 12 is a flowchart in the case that the number of the data for the transition probability distribution is small.

To know the information on the degree of each influencing factor on the positions of the component parts for the preventive maintenance of degradation of the component parts in a specific plant or plant under design or construction; or to obtain the information for the analysis of the transition probability distribution of the degradation phenomena and the information on the degree of the influencing factors, at least, from field incident information, inspection information, preventive maintenance information and monitoring information, for the preventive maintenance of degradation of the component parts in a specific plant or plant under design or construction;

means are provided to confirm a technology of prediction even for the data of an actual plant without predicting the transition probability phenomena of the degradation phenomena of the actual plant simply through experimental data, to evaluate whether or not the life phenomena in degradation of the actual plant is in the same category with those obtained by an acceleration experiment in laboratory and to improve the precision in prediction.

In the degradation phenomena, there are stress corrosion cracking, crack propagation, pitting, fatigue, corrosion fatigue, general corrosion, erosion, weld cracking and the overlapped phenomena on the other or the combination of two or more phenomenon.

In the influencing factors described above, there are chemical composition, mechanical strength and hardness as well as an amount of computing these states, such as a quantitative value of microstructural characteristics, chromium depletion zone or electrochemical measurement. In the stress influencing factors, there are residual stress, thermal stress, stress concentration, strain, operating stress, relaxation and others. In the environmental influencing factors, there are oxygen, hydrogen peroxide, hydrogen, nitrogen, conductivity, pH, crevice, chemical species, radiation and others.

Figure 1A:
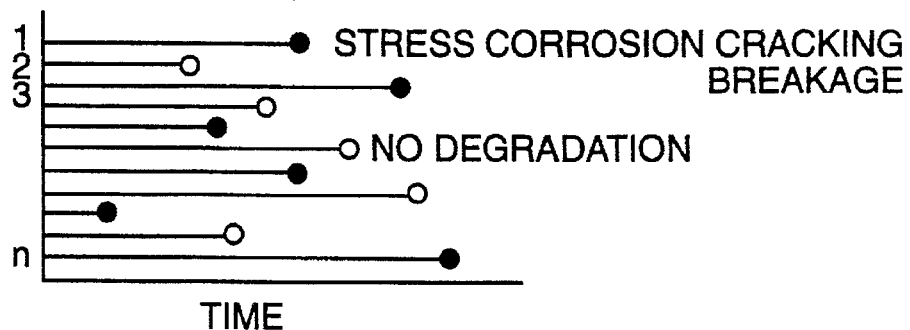
FIGS. 1(a)–1(c) are explanatory views showing an analysis of the life to degradation in the case of SCC.
Figure 1B:
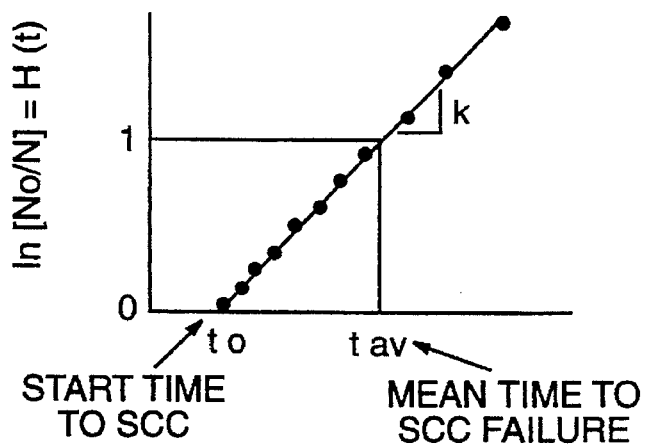
Figure 1C:
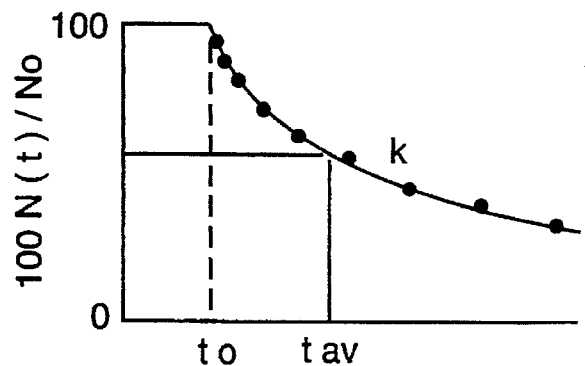

In the degradation phenomena, for example, the life phenomena of SCC in high temperature water can be analyzed by a transition probability model as shown in FIGS. 1(a)–1(c). The parameters in the transition probability distribution will be in the following three terms, namely:

<t>: mean time to SCC failure $t_0$: start time to SCC k: SCC reaction rate

Figure 2:
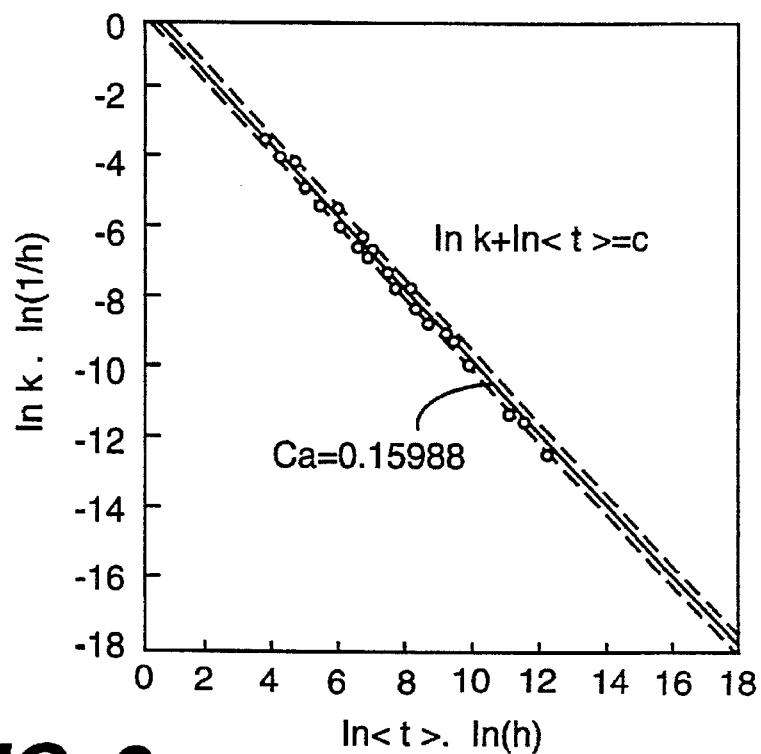
FIG. 2 is a view showing a correlation between the parameters of the transition probability distribution of degradation in the case of SCC.
Figure 3:
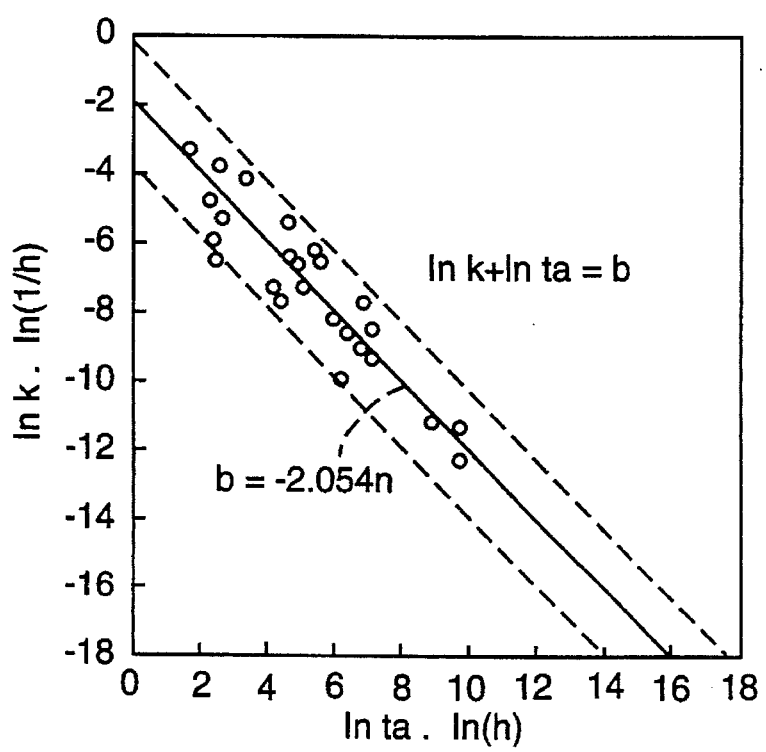
FIG. 3 is a view showing a correlation between the parameters of the transition probability distribution of degradation.
Figure 4:
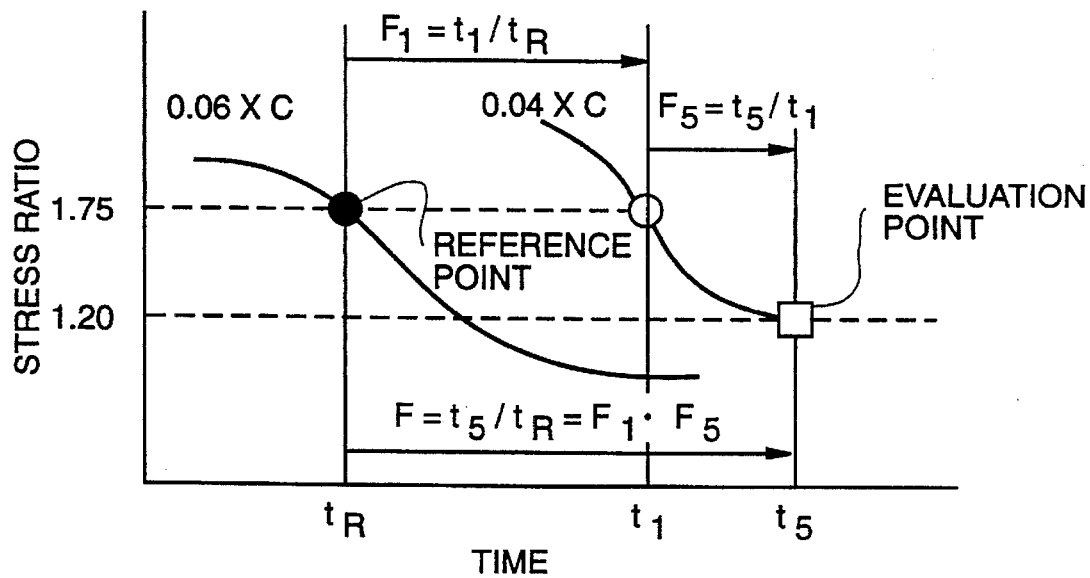
FIG. 4 is an explanatory view showing a concept of an index of degradation.
Figure 5:
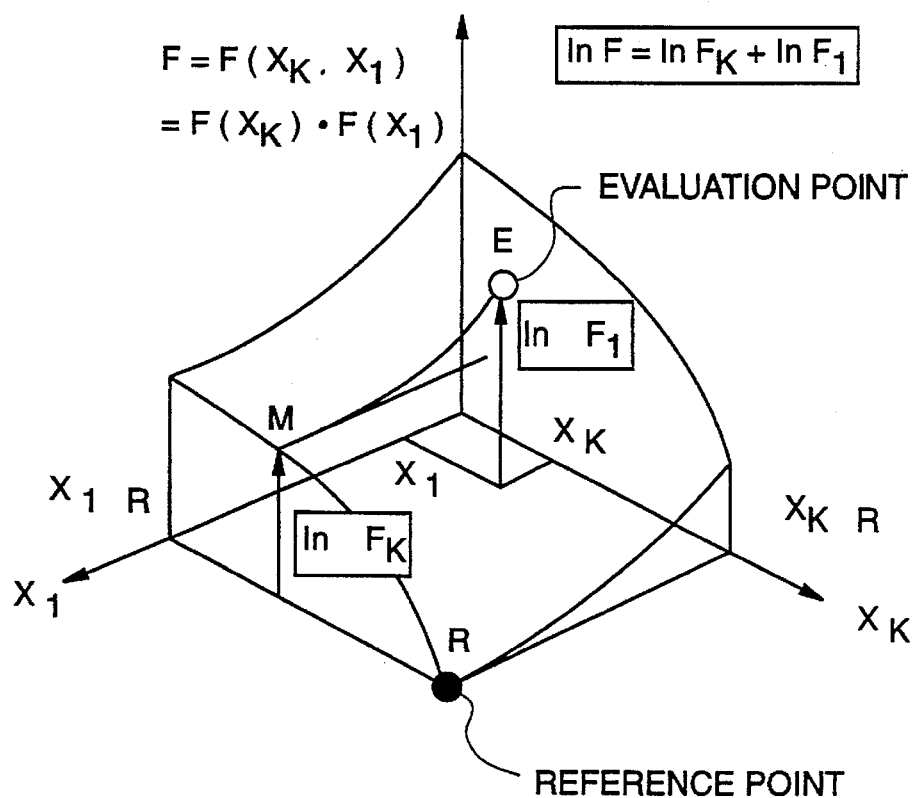
FIG. 5 is an explanatory view showing a product of the subdivided indices of degradation in which the variables of influencing factor are independent from each other.
Figure 6:
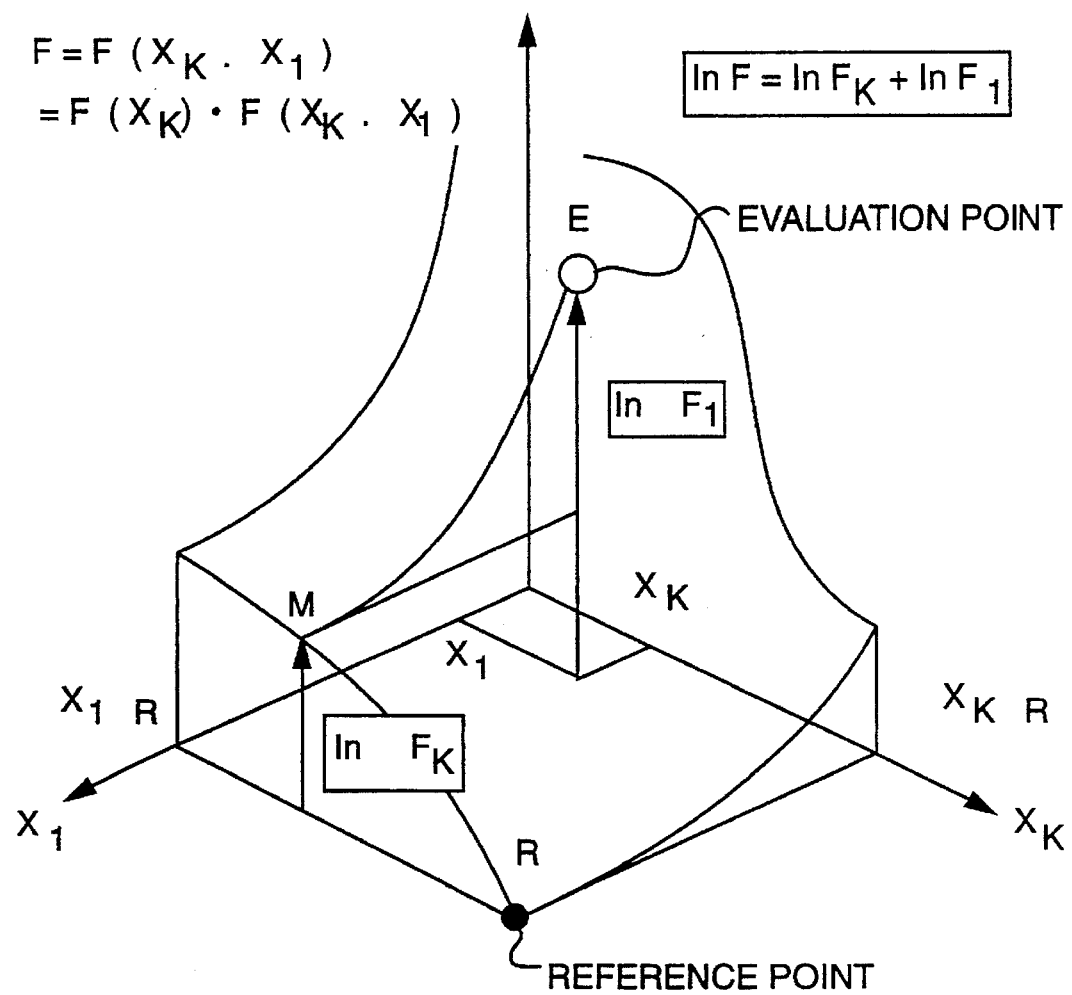
FIG. 6 is an explanatory view showing a product of the subdivided indices of degradation in which the variables of influencing factor are not independent from each other.

As shown in FIGS. 2 and 3, the weld of stainless steel SUS 304 sensitized in high temperature water, the weldments of an nickel base alloys 600·182 and the behavior of SCC life are clarified with the finding that there is a correlation between the transition probability distributions or the life parameters in many life systems.

Figure 7:
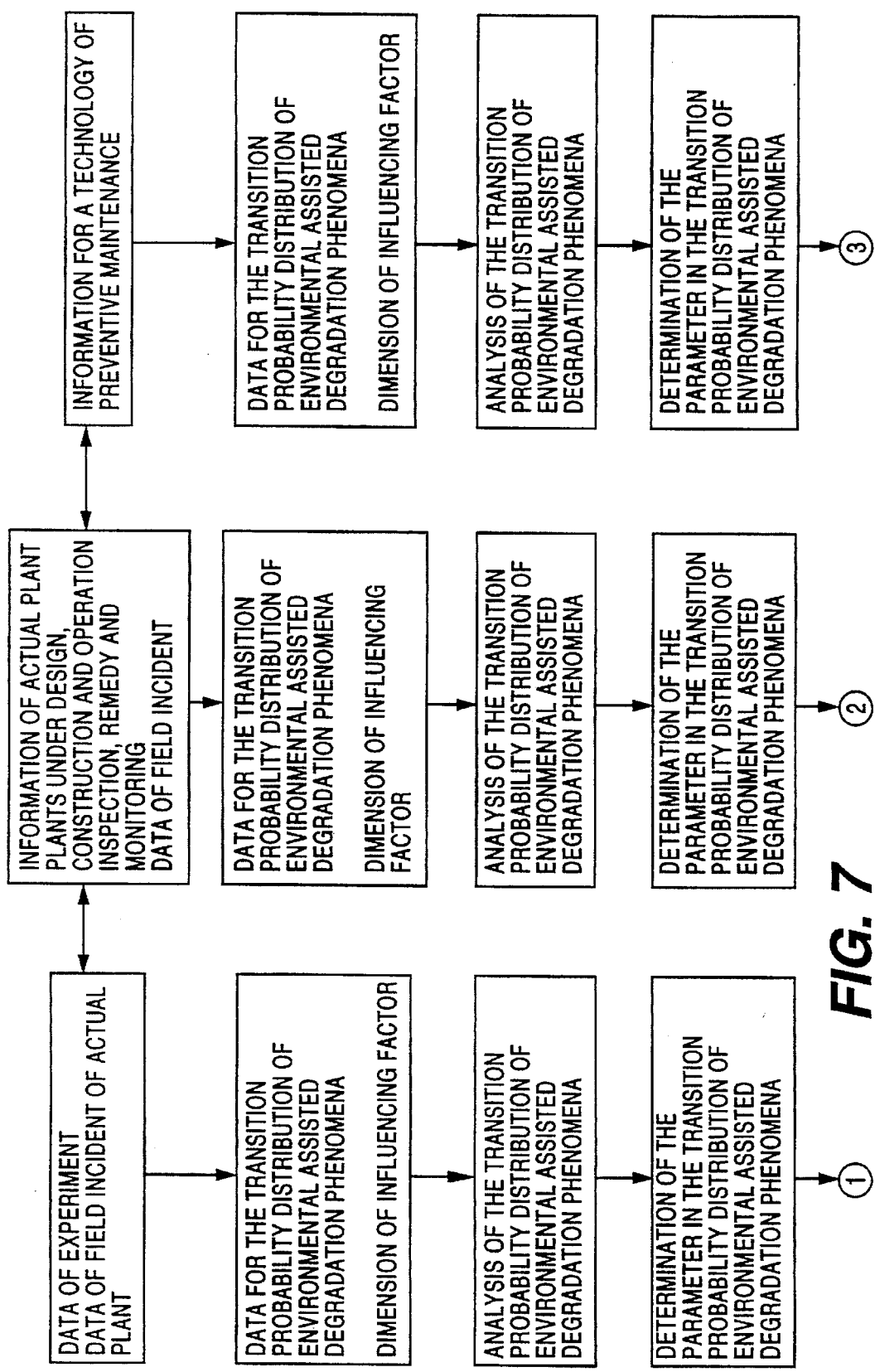
FIG. 7 is a flowchart showing a prediction of the transition probability distribution of degradation phenomena and an evaluation of the technology of preventive maintenance.
Figure 8:
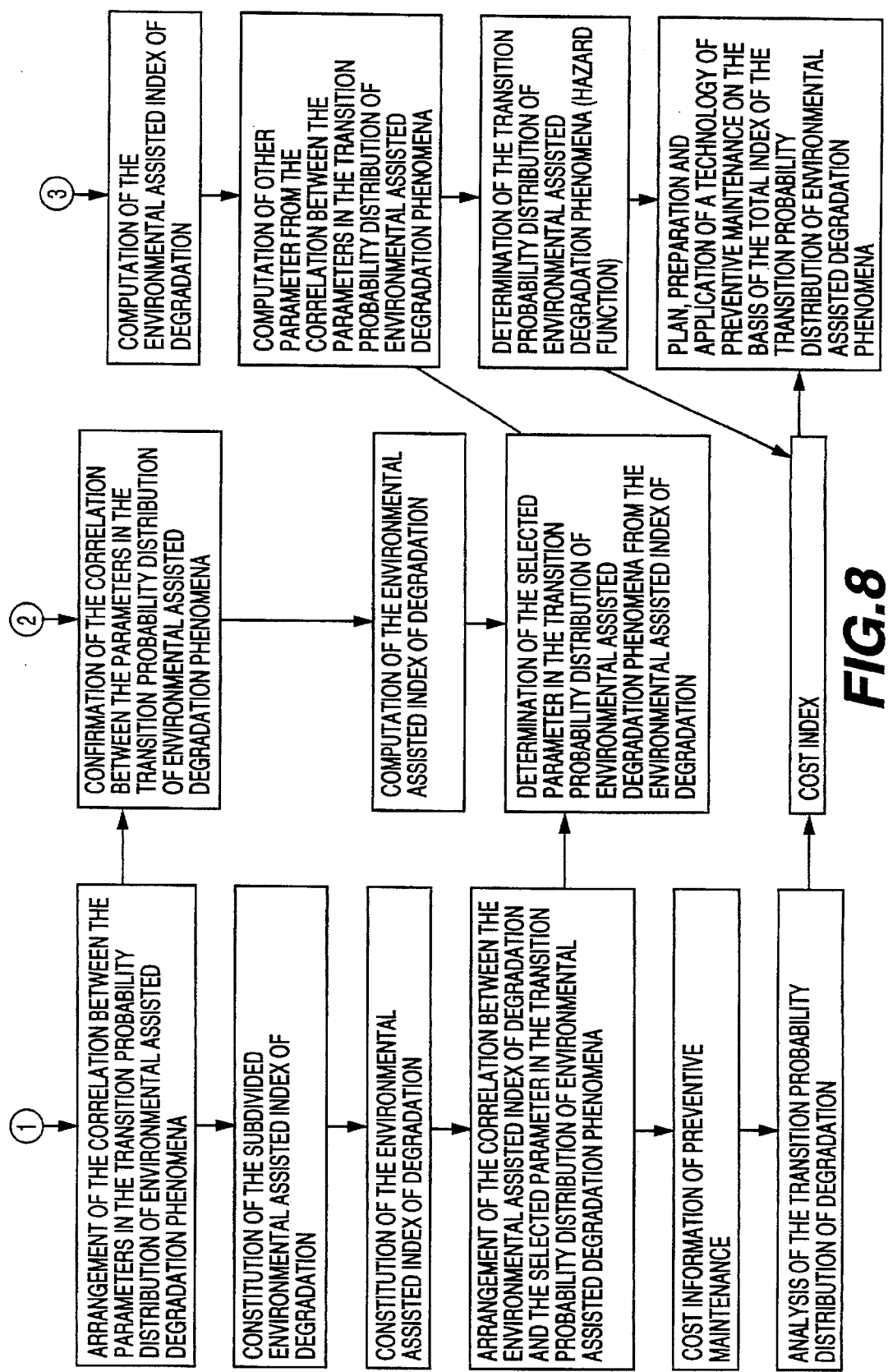
FIG. 8 is a flowchart showing a prediction of the transition probability distribution of degradation phenomena and an evaluation of the technology of preventive maintenance.

As shown in FIG. 7 or 12, once the parameter in one transition probability distribution is known by way of this correlation, the parameter in another transition probability distribution can be known.

The constitution of the degradation phenomena as shown in FIG. 7 or 12 can be carried out in such a manner as described above. As a sort of influencing factor on the generation life of SCC, the following eight influencing factors, namely: $X_1$ to $X_8$ are considered as variables.

$X_1$: variable of carbon content $X_2$: stabilization parameter $X_3$: low temperature aging $X_4$: variable of stress relief annealing $X_5$: variable of effective stress ratio $X_6$: variable of effective oxygen content $X_7$: variable of crevice $X_8$: variable of conductivity The variables of the influencing factors of the reference system were settled as follows:

$X_1$=0.06 wt %

$X_2$=−1

$X_3$=−1

$X_4$=−1

$X_5$=1.75

$X_6$=8000 ppb $X_7$=−1

$X_8$=0.5 μS/cm

Thus, the function of the subdivided index of degradation for each influencing factor is constituted. In the following description and in order to summarize the subdivided index of degradation, the following function will be defined as follows:

$N=0.13[[Nb]+2[Ti]]/[C]$

N: stabilization parameter $N_{CRIA}=C_p$ for Post Weld Heat Treatment (PWHT) condition $N_{CRIB}=C_a$ for as welded (AW) condition When $X_2 \geq N_{CRIA}$, then, $X_2=1$ When $N_{CRIA} \geq X_2 \geq N_{CRIB}$, then $X_2=h(X_4)-g(X_4)$ When $X_2 < N_{CRIB}$, then, $X_2=-1$ $X_5$=stress ratio to yield stress $X_6=[O_2]+[H_2O_2]/n$ $h(X)=(1+X)/2$ $g(X)=(1-X)/2$ X=+1 or −1 only, and M shows the kind of material.

M=+1 for Types 304, 316, 304L, 316L and 316NG stainless steel and their relating material N=+1 for 316 NG stainless steel (NG; nuclear grade material)

N=−1 for 304, 304L, 316L and 316 stainless steel

M=−1 for 600, 182 and 82 Nickel base alloys and their relating material

When there is a stainless steel, M=+1

When there is a nickel base alloys, M=−1

When C is $C_C$ or more, L=+1

When C is less than $C_C$, L=−1

When there is no low temperature aging, $X_3$=+1

When there is a low temperature aging, $X_3$=−1

When there is no stress relief annealing, $X_4$=+1

When there is stress relief annealing, $X_4$=−1

When there is no crevice, $X_7$=+1

When there is crevice, $X_7$=−1

A subdivided index of degradation of carbon content in a stainless steel will be expressed as follows:

$$A_1 = \exp\left[ (\ln 10) \left\{ \sum_{i=1}^{3} B_i (X_1 - X_{1R})^i \right\} \right]$$

$$F_J = h(M)[h(N) \cdot \alpha_1 + g(N) \cdot A_J] + g(M) \cdot \beta_1$$

if $F_1 \geq \gamma_1$, $F_1 = \gamma_1$

A subdivided index $F_2$ of degradation as a stabilization parameter which takes the stabilization parameter in nickel base alloys 600 weldments and nickel base alloys 182 and 82 weld metals as a variable is expressed as follows:

$A_2=h(X_2)\cdot\alpha_2+g(X_2)\cdot\beta_2$ $B_2=h(X_2)\cdot\gamma_2+g(X_2)\cdot\delta_2$ $$F_3 = h(M) \cdot \epsilon_2 + g(M) \cdot [h(X_4) \cdot A_2 + g(X_4) \cdot B_2]$$

On the basis of the experimental data, a subdivided index $F_3$ of degradation of SUS 304 stainless steel and nickel base alloys by low temperature aging was constituted in the following. In the case that the carbon content reached its limit or less and that its stabilization parameter reached its limit or more, the value of $F_3$ was set to 1 since there is no lowering of SCC life by low temperature aging.

$$A_3 = h(X_3) \cdot \alpha_3 + g(X_3) \cdot \beta_3$$

$$B_3 = h(X_4) \cdot \gamma_3 + g(X_3) \cdot \delta_4$$

$$C_3 = h(X_4) \cdot \epsilon_3 + g(X_3) \cdot \beta_3$$

$$D_3 = h(X_3) \cdot B_3 + g(X_3) \cdot C_3$$

$$F_3 = h(M) \cdot A_3 + g(M) \cdot D_3$$

On the basis of the experimental data, a subdivided index $F_4$ of degradation of SUS 304 stainless steel and nickel base alloys by PWHT was constituted in the following.

$$F_4 = h(M)[h(X_4) \cdot \alpha_4 + g(X_4) \cdot \beta_4] + g(M) \cdot \gamma_4$$

The influence of the effective stress ratio on SCC life was approximated by tan h function and the subdivided index of the stress was constituted as follows:

$$R_{1min} = \alpha_5 \cdot R_{1min0}$$

$$R_1 = 0.5(R_{1max0} + R_{1min})$$

$$S_1 = 0.5(R_{1max0} - R_{1min})$$

$$L_{R1} = (R_1 - x_5)/S_1$$

$$L_{R1R} = (R_1 - x_{5R})/S_1$$

$$A_5 = \gamma_5(R_{1max0} - R_{1min})/(R_{1max0} - R_{1min0})$$

$$F_{A5} = \exp[A_5 \cdot \{\arctan h(L_{R1}) - \arctan h(L_{R1R})\}]$$

$$R_{2min} = \beta_5 \cdot R_{2min0}$$

$$R_2 = 0.5(R_{2max0} + R_{2min})$$

$$S_2 = 0.5(R_{2max0} - R_{2min})$$

$$L_{R2} = (R_2 - x_5)/S_2$$

$$L_{R2R} = (R_2 - x_{5R})/S_2$$

$$B_5 = \delta_5(R_{2max0} - R_{2min})/(R_{2max0} - R_{2min0})$$

$$F_{B5} = \exp[B_5 \cdot \{\arctan h(L_{R2}) - \arctan h(L_{R2R})\}]$$

$$F_5 = h(M) \cdot F_{A5} + g(M) \cdot F_{B5}$$

If $F_5 > \epsilon_5$, then $F_5 = \epsilon_5$

The subdivided index of degradation of the effective oxygen content was constituted in the following. A critical diffusion current model of the effective oxygen content data is considered.

$$F_6 = [h(M) + g(M)] \cdot (x_{6R}/x_6)$$

$$x_6 = \exp[(\ln 10)(\delta_6 \arctan[(E_{ECP} - \alpha_6)/\beta_6] + \log_{10} \gamma_6)]$$

On the basis of the experimental data thus obtained, a subdivided index $F_7$ of degradation of SUS 304 stainless steel and nickel base alloys by crevice was constituted in the following. In the case that the carbon content reached its limit or less, and that the stabilization parameter reached its limit or more, the value of $F_7$ was set to 1 since there is no lowering of SCC life by crevice.

$$A_7 = h(x_7) \cdot \alpha_7 + g(x_7) \cdot \beta_2$$

$$B_7 = h(M) \cdot \gamma_7 + g(x_7) \cdot \delta_7$$

$$F_7 = h(M) \cdot A_7 + g(M) \cdot B_7$$

$$E_{ECPR} = \alpha_6 + \beta_g \tan h[(\log_{10} x_{6R} - \log_{10} \gamma_6)/\delta_6]$$

On the basis of the experimental data thus obtained, a subdivided index $F_8$ of degradation of SUS 304 stainless steel and nickel base alloys by conductivity was constituted in the following.

$$A_8 = \sum_{i=0}^{3} E_i \cdot (E_{ECPR})^i$$

$$F_8 = [h(M) + g(M)] \cdot \exp[(\ln 10) \cdot \{(x_{8R} - x_8)/A_8\}]$$

The test results of each SCC life of the weldments of 304 stainless steel and 600 and 182 nickel base alloys in laboratory were analyzed and a subdivided index F of degradation determined from the start time of SCC and the experimental condition was examined.

$$F = \Theta \times F_1 \times F_2 \times F_3 \times F_4 \times F_5 \times F_6 \times F_7 \times F_8$$

whereas the symbols in the above equation are as follows:

$A_i$: value of the index of degradation under computation $B_i$: value of the index of degradation under computation b: coefficient of the correlation between the parameters in transition probability distribution of SCC $b_i$: mean value of the coefficient of the correlation between the parameters in transition probability distribution of SCC $b_0$: mean value of the coefficient of the correlation between the parameters in transition probability distribution of SCC

[C]: carbon content (wt. %)

c: coefficient of the correlation between the parameters in transition probability distribution of SCC $c_0$: mean value of the coefficient of the correlation between the parameters in transition probability distribution of SCC E: symbol of an evaluation system $E_{ECP}$: corrosion potential F: index of degradation $F_j$: subdivided index of degradation of the influencing factor at the j-th time $F_{Ai}$: value of the index of degradation under computation f: ratio of a time t to SCC failure in an evaluation system vis a time $t_R$ to SCC failure in a reference system g(x): a function h(x): a function

[$H_2O_2$]: hydrogen peroxide conent (ppb)

i: the i-th influencing factor of SCC life k: the k-th influencing factor of SCC life k: transition probability of SCC life or SCC reaction ratio $L_{Ri}$: value of the index of degradation in a reference system under computation $L_{RiR}$: computed $L_{Ri}$ of the index of degradation in a reference system M: subparameter of the kind of material N: parameter of the kind of material N: stabilization parameter N: number of samples of no SCC at an arbitrary time $N_0$: initial number of samples

[Nb]: niobium content (wt. %) of nickel base alloys n: number of influencing factors n: constant in the equation of effective oxygen content

[$O_2$]: oxygen content (ppb)

R: symbol of a reference system $R_{1max0}$: maximum strength of a material at an evaluation time of SCC $R_{1min}$: maximum strength of a material at an evaluation time of SCC $R_{1min0}$: yield stress of a material

[Ti]: titanium content (wt. %)

<t>: average life time (h)

$t_0$: start time to SCC (h or year)

$t_i$: SCC life corresponded to the i-th influencing factor t: SCC life of an evaluation system (h)

$t_R$: SCC life of a reference system (h)

$x_i$: variable of the i-th influencing factor $x_{iR}$: variable of the i-th influencing factor in a reference system α: constant $α_i$: coefficient of the subdivided index of degradation $β_i$: coefficient of the subdivided index of degradation $γ_i$: confidence level of the subdivided index of degradation $δ_i$: coefficient of the subdivided index of degradation $ε_i$: coefficient of the subdivided index of degradation δ: coefficient of the index of degradation Θ: coefficient of the subdivided index of degradation $σ_y$: yield stress (MPa)

τ: SCC life of an evaluation system $τ_R$: SCC life of a reference system

Figure 13:
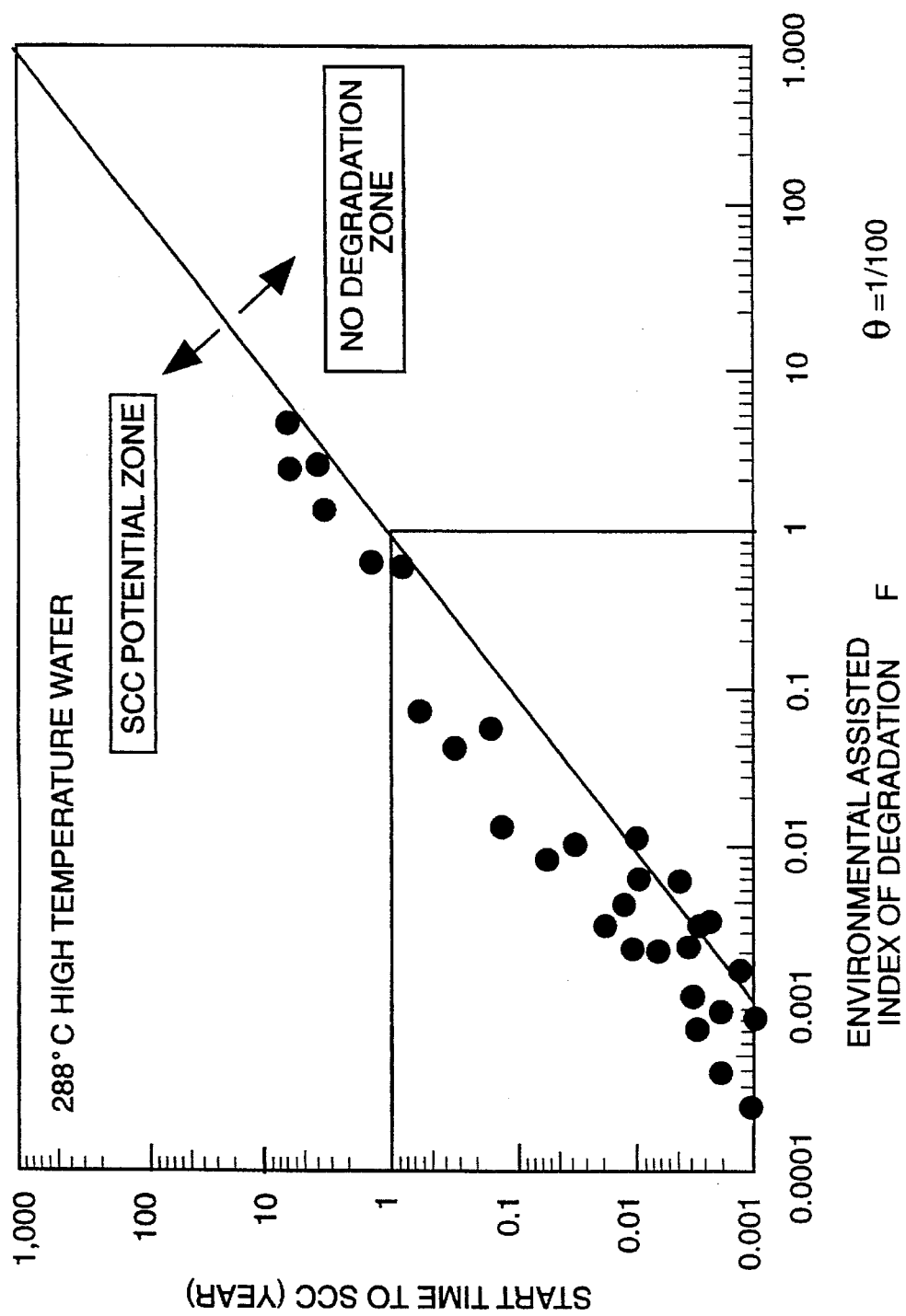
FIG. 13 is a view showing a correlation between an index of degradation and a parameter of the transition probability distribution.

FIG. 13 illustrates a relation between the value of life index in each life system and the start time $t_0$ (year) to SCC. The slope given by the straight line in the drawing is equal to 1 and the coefficient Θ in the life index was set to 1/100 herein, where a constant a was determined so that this straight line might be brought to the lower part of data band.

In FIG. 13, the vertical axis is represented by SCC start time which time is defined as shown in FIGS. 1(a)–1(c). It is evident from the data in a total life system, however, that the occurrence of SCC is hard on the side of shorter time and there are possibilities for the occurrence of SCC on the side of longer time.

It is also found from FIG. 13 that there is a correlation between the index of a degradation and the start time to SCC which is a parameter in the transition probability distribution of the degradation. The parameter in the transition probability distribution of the degradation phenomena shown in FIGS. 7 and 12 means what is explained in FIG. 13.

In many systems of the degradation phenomena, to constitute a correlation which shows the relation of degradation with the index of degradation is to make it possible to determine one of the parameters in the transition probability distribution of the degradation phenomena from the index of degradation only by determining the value of a predicted reliability and giving the dimension of the influencing factor in an evaluation system.

In other words, it is available for determining the value of the selected parameter described above, which determines the transition probability distribution of the degradation phenomena from the variables for the degree of the influencing factor on the degradation phenomena in an evaluation system.

As shown in FIGS. 7 and 12, it is also available for determining the value of the selected parameter described above, which determines the transition probability distribution of the degradation phenomena in an evaluation system, using the correlation described above between the parameters, which determines the transition probability distribution of the degradation phenomena of the explanation in the effects of the invention described above.

It is also available for estimating the transition probability distribution and hazard function of the degradation phenomena in an evaluation system.

In FIGS. 7 and 12, a hazard function of the transition probability distribution obtained from the index of degradation is directly compared with that obtained from the index of degradation which can be derived from the life analysis of degradation of the actual plant, and then, the preventive maintenance of the plant from its degradation is considered after the confirmation of the precision in prediction.

For the degradation phenomena at the positions of the plant component parts in the evaluation system, the transition probability distribution and the hazard function obtained in the above description are obtained. On the basis of this, it is available to determine the necessity or lack thereof of any preparation and the number of the year when it will be necessary.

In FIG. 13, in the case of considering the life time as 50 years and when the index of degradation at the point of an evaluation system is 10, it may be good enough to take a five-time required improvement factor M as a technology of preventive maintenance. FIG. 14 illustrates this relation using a transition probability distribution by taking a reliability α employing a function of reliability into consideration.

A required improvement factor M for an arbitrary preventive technology is represented by the following equation.

$$\log(M)=\log(\text{target time for preventive maintenance})-\log(F)+\log(α)$$

Figure 16A:
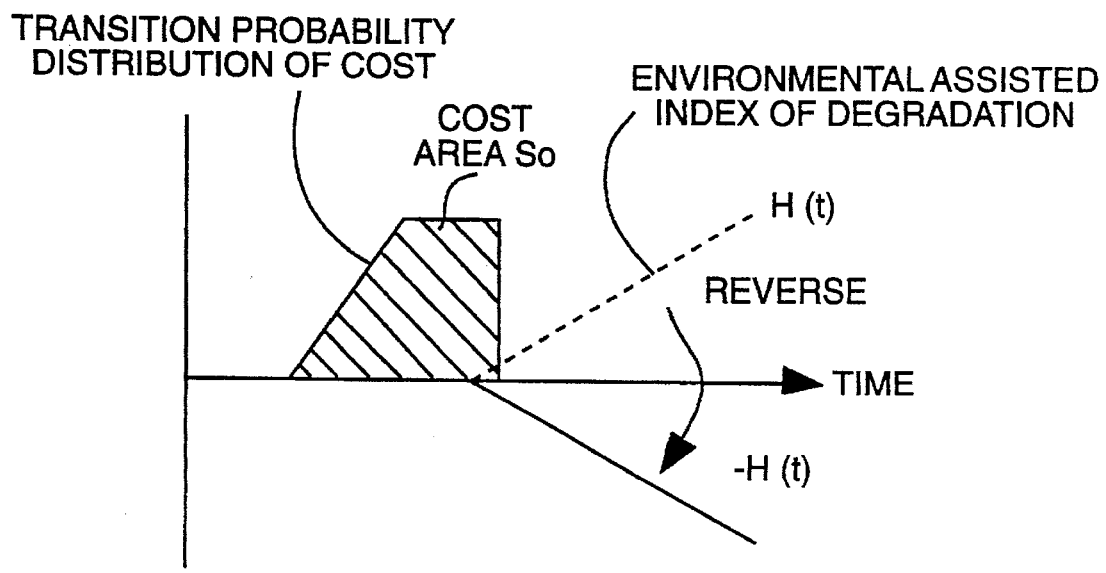
FIGS. 16(a)–16(b) are explanatory views showing a computation method for required improvement factor of the technology of preventive maintenance to degradation.
Figure 16B:
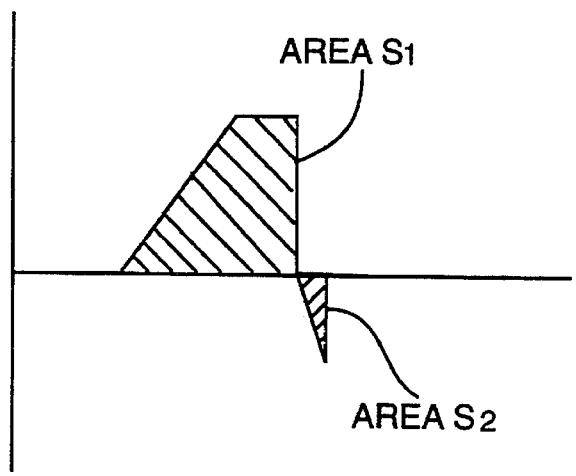
Figure 17:
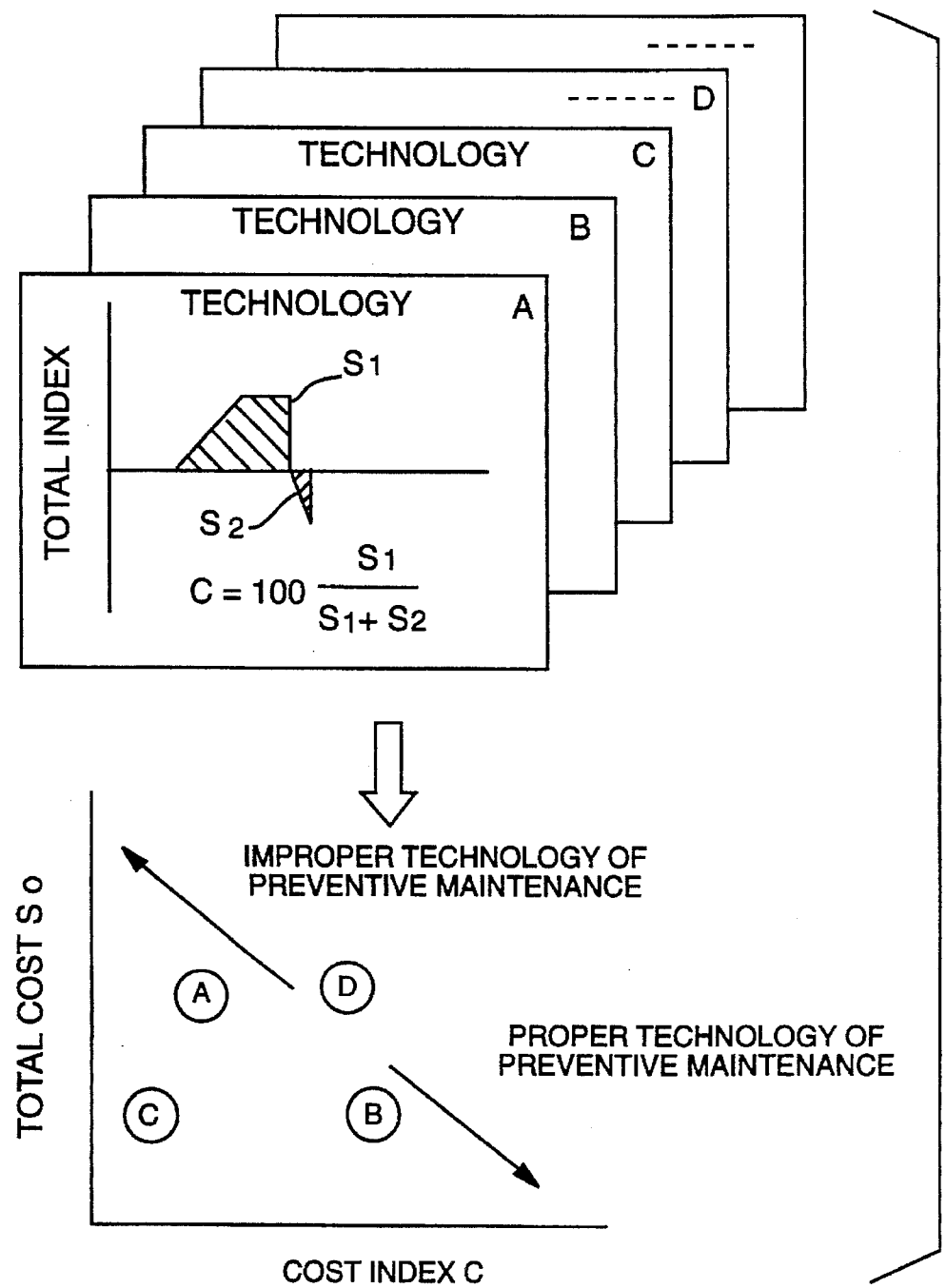
FIG. 17 is an explanatory view showing a computation method for required improvement factor of the technology of preventive maintenance to degradation.

As shown in FIGS. 15 and 17, an index of cost to be a cost evaluation of preventive maintenance is introduced to this case in addition to the index of degradation as a technical direction relating to the application of any given preventive maintenance, and the total direction can be also introduced by making both of them together. With respect to the procedure in FIGS. 15 and 17, first of all, FIG. 16(a) is obtained from the product of the cost transition probability and the reversed function of hazard function of the index of degradation, and then calculated to give FIG. 16(b). Finally, a correlation is obtained between the index of cost and the total cost $S_o$ which are shown in FIG. 17. The details are as follows.

The transition distribution of cost required for preparation and application is put in order for every technology of preventive maintenance for each plant component. On the other hand, in the case of combining the hazard function obtained from the transition distribution thus put in order with the index of cost as shown in FIGS. 16(a)–16(b), another function is prepared by multiplying a hazard function H(t) with a value of −1 and then allowed to give its product with a function of the transition distribution of cost when the index of cost is required.

In an integration area $S_0$ by time variable in terms of the transition distribution represented by the total costs and an integration part by time variable of the product of the function of the transition distribution of cost with a hazard function H(t), a positive area is defined as $S_1$ and a negative area is defined as $S_2$. Then, an index C of cost is defined by the following equation to make it possible to select a correct preventive maintenance from the correlation between the total costs $S_o$ and the index of cost as shown in FIG. 17, namely:

$$C=100\times S_1/(S_1+S_2)$$

Considering an information on the transition distribution of technological degradation and an index of cost from the transition distribution of cost both together in this manner, it will be easy to determine the necessity or lack thereof of any preparation and the number of years until the preparation. If a technology of preventive maintenance is planned and prepared from these things, an applicable technology of preventive maintenance for the positions of plant component parts can be arranged.

Figure 18:
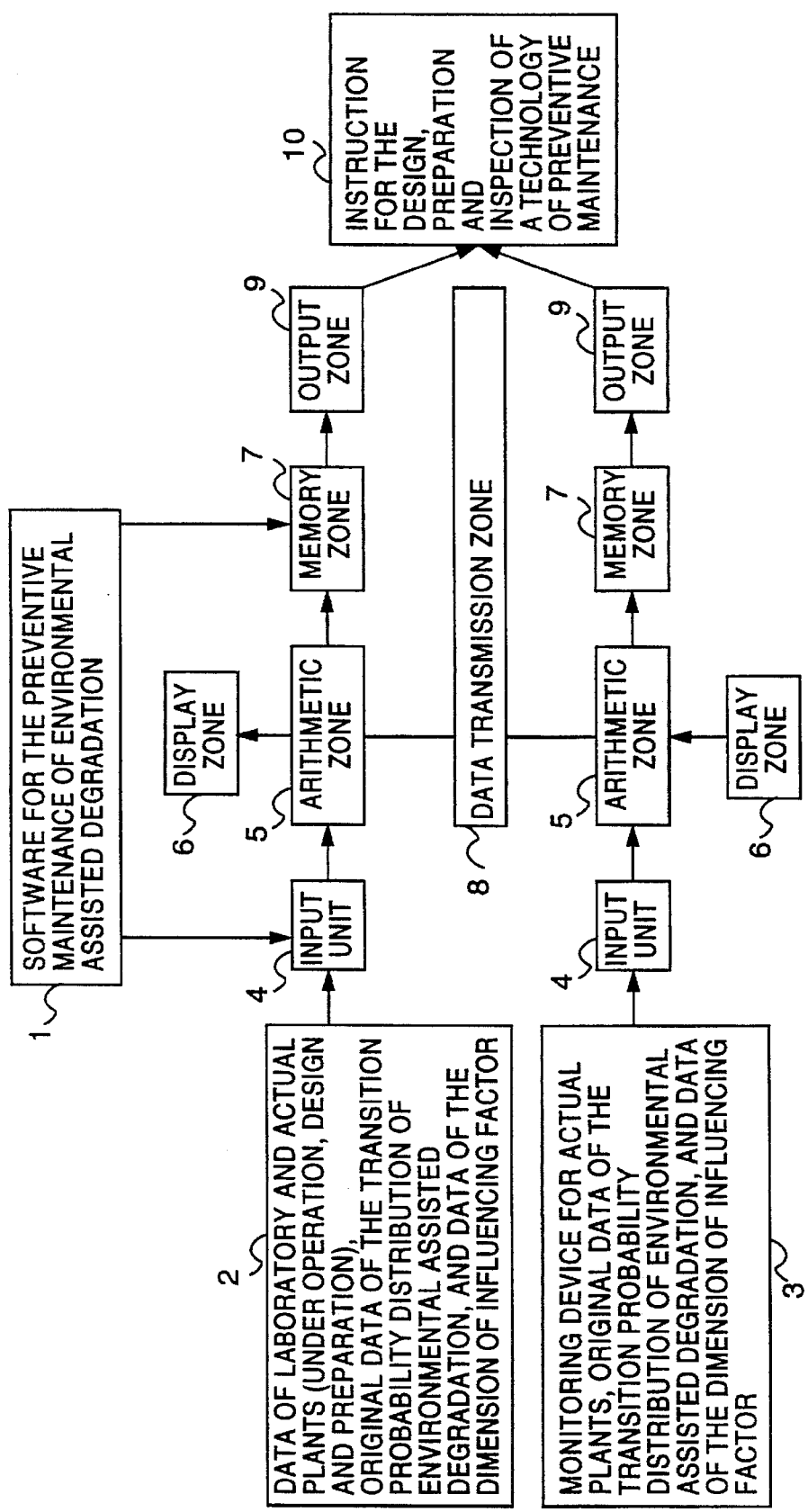
FIG. 18 is a block diagram showing a system constitution of the technology of preventive maintenance to degradation.

As shown in FIG. 18, it is a main point to have a technology of preventive maintenance according to the present invention, an input system for the data of both laboratory and actual plant, and a continuity with an actual plant monitoring device and therefore, the subsequent input and output unit, memory, operation, display and evaluation system of degradation are all automatized by computers.

In FIG. 18, 1 indicates a program software for a technology of preventive maintenance, 2 indicates data of laboratory and actual plant, 3 indicates an actual plant monitoring device, 4 indicates an input unit for inputting data of laboratory and actual plant described above and through the actual plant monitoring device 3, 5 indicates an arithmetic zone for various computations, 6 indicates a display zone composed by a CRT display, e.g., 7 indicates a memory zone composed by RAM, 8 indicates a data transmission zone, 9 indicates an output zone composed by a printer, e.g., and 10 indicates an instruction for the design, preparation and inspection for a technology of preventive maintenance printed out by the output zone 9, respectively.

EXAMPLE 2

The detailed description of the preferred embodiment of the present invention will be given along with the drawings in the following.

Figure 19:
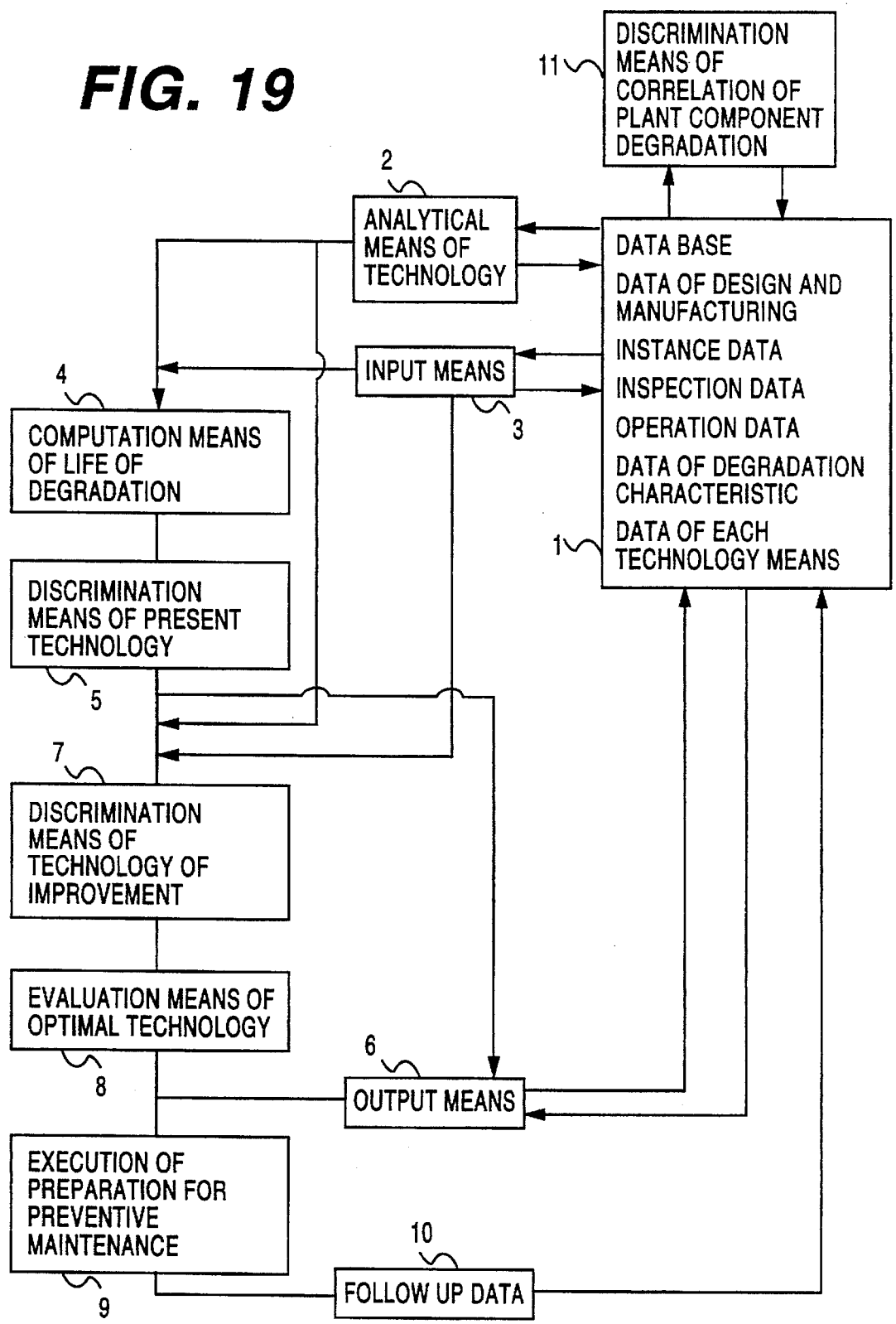
FIG. 19 is a system diagram showing a system of reliability improvement for a plant component according to a preferred embodiment of the present invention.

FIG. 19 is a system diagram showing a system for improvement of reliability on plant components as a preferred embodiment of the present invention. In the drawing, 1 indicates a data base relating to plant components, and in which a variety of data, such as design of plant components, data of production, data of field incident, data of inspection, data of operation, data of failure characteristics, data of each technological means and others are all stored. Then, 2 indicates a means for technology and analysis, 3 indicates an input means such as a key board, 4 indicates a computation means for the life of degradation, 5 indicates a discrimination means of the present technology, 6 indicates an output means such as a printer, 7 indicates a discrimination means of improvement of technology, 8 indicates an evaluation means of optimal technology, 9 indicates a technology for operation of preparation, 10 indicates a follow-up data, and 11 indicates a discrimination means for correlation of degradation of plant components, respectively.

The mechanism of this system for improvement of reliability on plant components will be explained in the following.

(1) The present application technology for each position of plant components is subdivided into each influencing factor by a means 2 for technology and analysis described above. This means subdivides the material, production, structure and others of each position of a plant component to be evaluated.

A product of the subdivided indices is obtained by Equation (1) described above to calculate a value of the life index of degradation. If a subdivided index Fj which is based on a reference value is set as a function of the influencing factor of a present application technology, the subdivided index Fj can be computed only by inputting the value of the influencing factor of the present application technology.

The life index of degradation obtained for each position of a plant component by an arithmetic means 4 in FIG. 19 described above is shown in the right column of FIG. 20.

(4) A discrimination means 5 of the present technology shown in FIG. 19 compares the life index value of degradation of each position of the plant component obtained by an arithmetic means 4 described above with a predetermined value and extracts each position of the plant component showing a smaller life index value of degradation than the predetermined value.

(5) Each position of the plant component extracted by a discrimination means 5 of this present technology is outputted by an output means 6 together with the index value of degradation.

As shown in FIG. 19, the output condition by this output means 6 is outputted to the plant component and its position as a F value in an evaluation column of degradation potential. Each stage of the levels of degradation is also outputted as a numerical value in the same evaluation column of degradation.

Furthermore, the results of evaluation of degradation on each position of the plant component based on a past field incident and an inspection evaluation in a data base 1 are extracted and outputted at the same time. The items VT, ET, PT and UT in the column of the inspection evaluation mean a visual test, eddy current test, liquid penetration test and ultrasonic flaw detection, respectively.

The preparation for preventive maintenance can also be carried out by referring to the outputted index value of degradation, level of degradation, evaluation of field incident and evaluation of inspection. Incidentally, the evaluation of field incident means the evaluation of life index based on the field incident of a plant component.

As evident from FIGS. 20 and 22, the life index F value of degradation for each position of the present plant component may take various values. With respect to the position of a plant component having a small life index of degradation, some preparations for preventive maintenance can also be managed by monitoring and waiting until the end of its life. The present invention is based on such an idea that since the positions of a plant component where an index value of degradation is small, the incident accident probability gets large with time, thus the life index F value of degradation should be rather positively converted into a large value using the preventive technology.

Incidentally, the difference in this life index F value of degradation is often assessed from the initial stage of operation of plant. The difference in the life index value can also be said for a newly constructed plant component. There are some cases that the life index value of degradation in a technology itself to be applied is small from the beginning. In these cases a new technology of preventive maintenance is required for a large life index.

As to a means for improving the life index value of degradation at the positions of a plant component having this small life index value of degradation, the following will be executed.

(6) Various technologies of preventive maintenance for the improvement of each position of the plant component extracted by a discrimination means of the present technology shown in FIG. 19 is inputted by the input means 3 described above.

For example, each technology of preventive maintenance, such as a hydrogen water chemistry and hydrogen injection shown in FIG. 23, replacement of plant component parts, water jet peening (WJ), buttering on corrosian resistance cracking improvement of residual stress by high frequency induction heating for stress improvement (IHSI), improvement of heat affected zone by fuse of low heat input or so on, is replaced with each influencing factor for input. In this case, it is convenient to use a discrimination means 11 for the correlation of degradation of plant components for requiring the kinds of technologies, each position of plant components, and the correlation between the influencing factors.

(7) Each evaluation is made on the input of each technology of preventive maintenance by a discrimination means 7 for the technology of improvement shown in FIG. 19. This method is applied while obtaining the subdivided index and the life index F value of degradation from each influencing factor in each technology of preventive maintenance, in similar manner with an arithmetic means 4 for the life of degradation described above.

For example, the preparation for a position d1 of a plant component, the life index F value of degradation of which is 11 in FIG. 20, is described in FIG. 21, in the case of evaluating a technology of hydrogen water chemistry (hydrogen injection) as a technology of preventive maintenance.

In other words, an effective oxygen content X6 of all influencing factors at the position d1 of the plant component can be set to such a value as shown in FIG. 21, when hydrogen gas is injected, and the values of the other influencing factors become the same values shown in FIG. 20. When the life index F value of degradation described above is obtained using these influencing factors, the resulting value becomes 200 or more. Incidentally, since not only the position d1 of the plant component but also other positions thereof are influenced in the case of injecting hydrogen gas, the life index F value is calculated and obtained even in its influenced range. In any case, they are improved to give the life index F value of degradation more than a predetermined value.

When each technology of preventive maintenance is estimated while obtaining the life index F value of degradation by such a means, the result is given in the evaluation column for the technology of preventive maintenance shown in FIG. 23.

(8) A technology of preventive maintenance obtained by a discrimination means 7 of the technology of improvement described above has been obtained from a technological aspect, but the preparation for preventive maintenance aspect should be totally decided while including cost and other factors.

A discrimination means 8 of optimal technology shown in FIG. 19 determines an optimal technology of preventive maintenance taking cost and difficulty or ease in a preparation technology thereof into consideration, corresponding to the technology of preventive maintenance obtained by a discrimination means 7 of the technology of improvement described above. That is, the technology of preventive maintenance is not always the only one although shown in the evaluation column of preparation in FIG. 23, and it is often possible to combine a plurality of technologies of preventive maintenance with each other.

(9) As shown in FIG. 23, the results of the above evaluation for the technologies of preventive maintenance are outputted as a technology of preventive maintenance to each position of plant components.

In the above description, the example of SCC degradation of plant components was mainly explained, but in fact, it should be farther evaluated while taking a degradation in strength such as a fatigue, creep and others, and a degradation factor such as irradiation damage of material by irradiation.

In the case of considering a plurality of degradation factors, the life index F value of degradation is represented by the following equation.

$$F(x) = \sum_{i=1}^{m} F_i$$

whereas $F_i$ is the life index F value of degradation of a degradation factor i.

EXAMPLE 3

Figure 24:
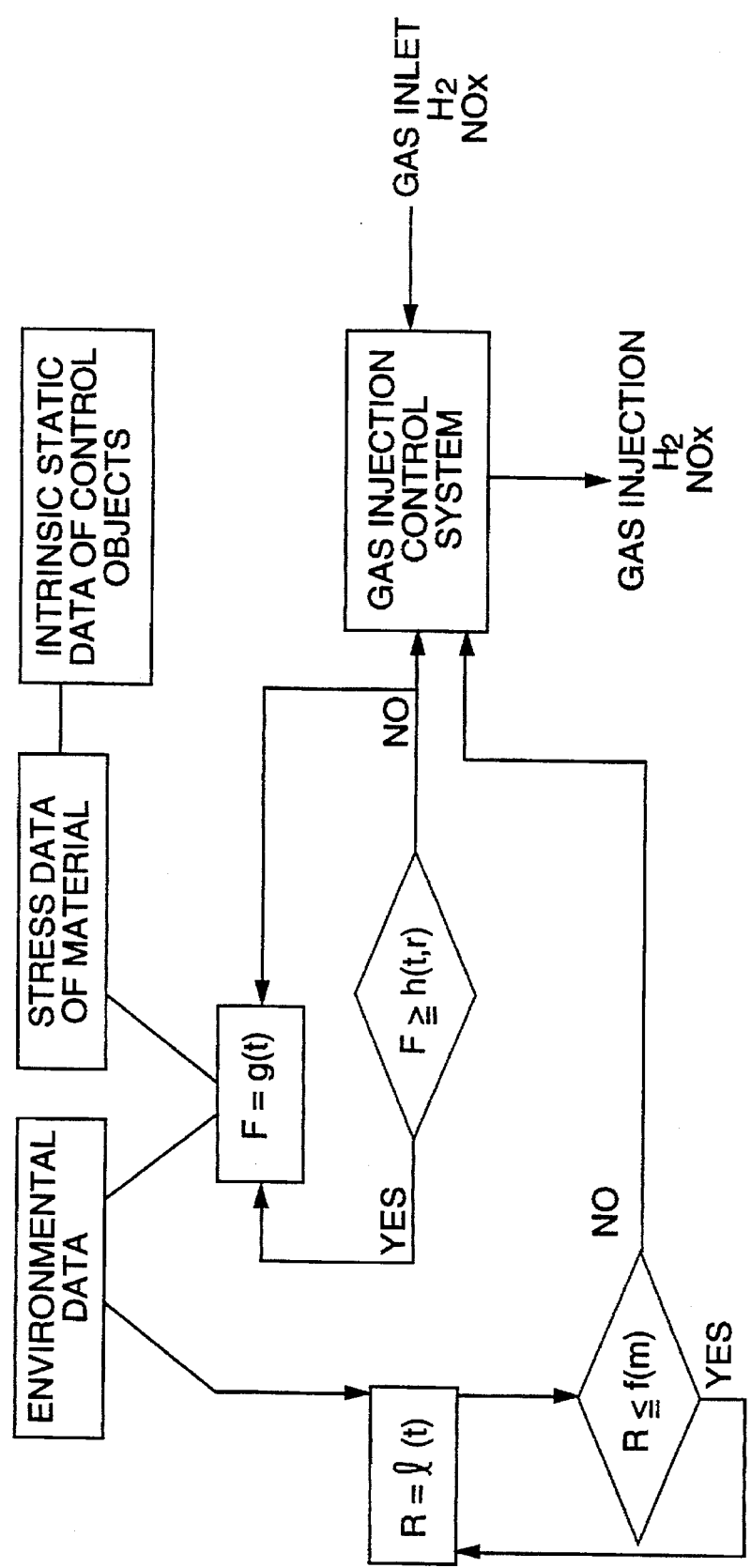
FIG. 24 is an explanatory flowchart showing a method of operation control for a plant according to a preferred embodiment of the present invention.
Figure 25:
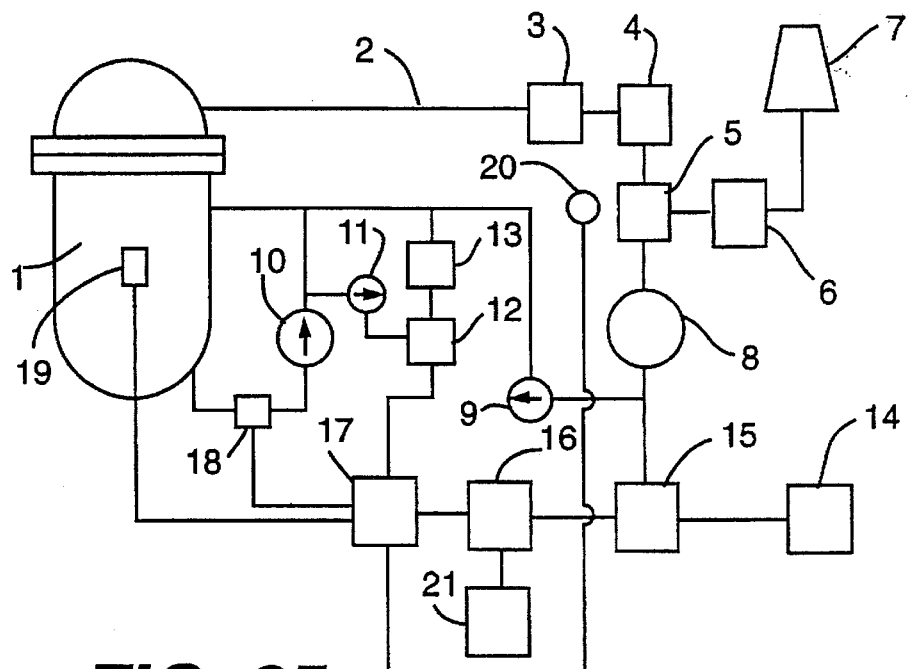
FIG. 25 is a block diagram showing a plant operation control device in a nuclear power facility according to a preferred embodiment of the present invention.

FIG. 24 is an explanatory flowchart showing a plant operation control method as a preferred embodiment of the present invention. FIG. 25 is a block diagram showing a plant operation control device as a preferred embodiment of the present invention.

An overall constitution of a plant operation control device will be explained along FIG. 25. Steam is produced at the reactor core of a nuclear reactor pressure vessel 1, passed through a main steam pipe 2, and led into a high pressure turbine 3 and a low pressure turbine 4 to generate electricity. The vapor after the generation of electricity is passed through a condenser pump—desalinator 8 through a condenser 5, and backed again to the nuclear reactor pressure vessel 1 through a water supply pump—water supply heating system 9. Incidentally, the exhaust gas degassed from the condenser 5 is vented through an exhaust gas treatment apparatus and a stack 7.

Various sensor group 18 for detecting each information of the influencing factor on stress corrosion cracking is provided on the way of a recycling system 10. A similar sensor group 12 or 19 is provided to a reactor cleaning system 13 and a reactor core of the pressure vessel 1 in order to check doubly. Furthermore, a dosimeter 20 is installed to a turbine system.

Each information of the influencing factor on stress corrosion cracking is inputted into the computer of the main body of a control system 16 through an information converter 17 from each sensor group 12, 18 or 19. The main body of the control system 16 is connected to an injection control system 15 for hydrogen gas and $NO_x$. Incidentally, in the drawings, 11 indicates a reactor water cleaning system, 14 indicates hydrogen gas—$NO_x$ sources, and 21 indicates an input unit such as a key board for the input of various data.

The injection control of hydrogen gas and $NO_x$ gas will be explained along FIG. 26.

Various influencing factors on stress corrosion cracking life are broadly divided into environmental data, material and stress data, and the intrinsic static data of control objects.

As the environmental data described above, there are, for example, dissolved oxygen in reactor water, dissolved hydrogen peroxide, dissolved hydrogen, conductivity, temperature, nitrogen oxide, corrosion potential, crack initiation, quantity of state of progress, pH, and others.

As the material and stress data described above, there are the quantity of state for metallurgical knowledge, such as the size of material of plant component, chemical compositions, the mechanical strength and hardness of material, the stress, thermal stress, strain and residual stress applied on material of plant component, coefficient of stress concentration, relaxation, grain size, precipitation and others.

As the intrinsic static data of the control objects described above, there are states, such as whether or not the field incident of other plant is available, whether or not any remedy is necessary, the tip component of crevice and others.

These environmental data, material and stress data and intrinsic static data of control objects are passed from various sensor groups 12, 18 and 19 through the information converter 17 or the input unit 21 and forwarded to the main body of the control system 16 as an input.

$$F \geq h(t, r) \quad (1)$$

F: F - index
t: an environmental assisted cracking life
r: a level of reliability
h: a function On the other hand, in a relation of expressing the state of process of F - index of the position of component in the plant and in the case of aiming at one or more influencing factors, a variable Xj in the dimensions of the influencing factors is represented as a function of time, namely:

$$Xj(t)$$

A subdivided index Fj of the influencing factor is represented as a function of its variable Xj(t), namely:

$$Fj[Xj(t)]$$

Furthermore, defining the intrinsic index of the positions of the plant component based on the intrinsic static data of the control object described above as an instrisic index of the plant component, and the subdivided intrinsic index of the plant component as a Fzi, the overall F - index can be represented by Equation (2) in the following and the resulting F - index will be calculated.

$$F = \pi_{i=1}^{l} Fzi \times Fj[Xj(t)] \times \theta \; \pi_{\substack{i=0 \\ i \neq j}}^{n} Fi \quad (2)$$

In order to calculate the value of F - index, the processes of input, computation and decision (discrimination) are proceeded every second and at the same time, the dose of the turbine system is measured by the dosimeter 20 to calculate and decide every second. R indicates a dose, and R=1(t) represents time variation in dose. This R judges whether or not it satisfies the range less than the permissible dose f(m) set up according to a stage m, and then decides hydrogen gas and $NO_x$ gas injection content if R does not exceed the acceptability limit f(m) to give such a system as to inject hydrogen gas and $NO_x$ gas from the gas injection system.

Figure 26:
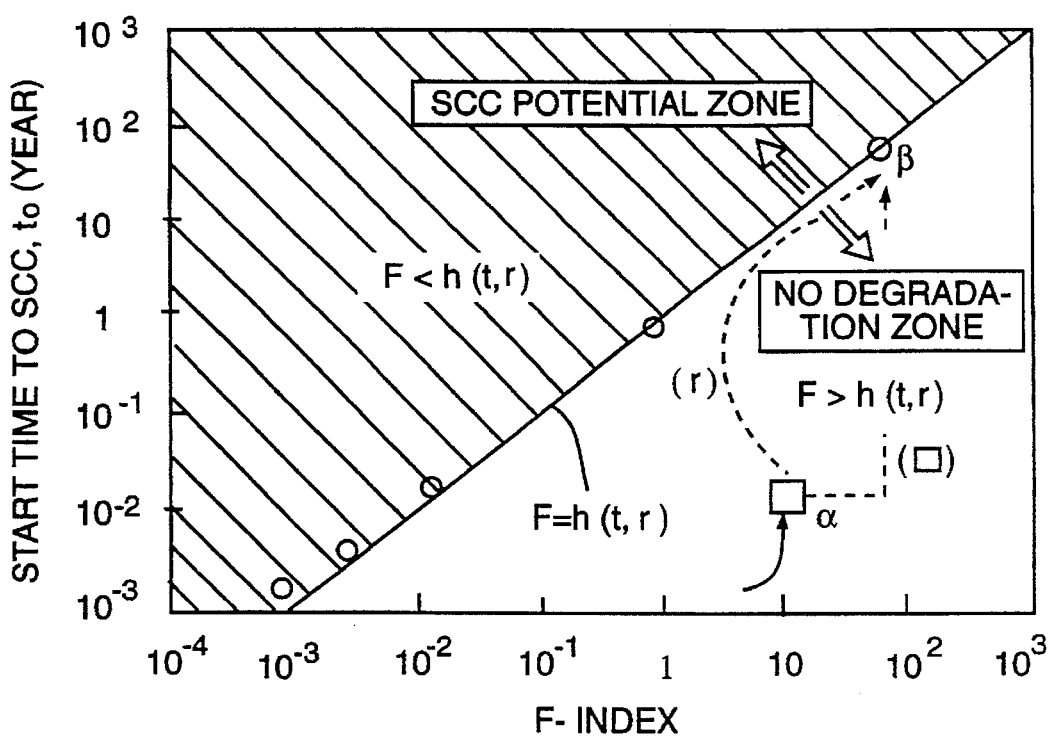
FIG. 26 is a characteristic diagram showing a relation between F - index and start time to SCC.
Figure 27A:
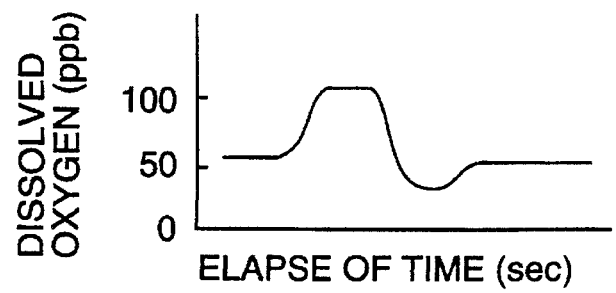
FIGS. 27(a)–27(e) are views showing a time variation of the influencing factor and a condition of hydrogen injection.
Figure 27B:
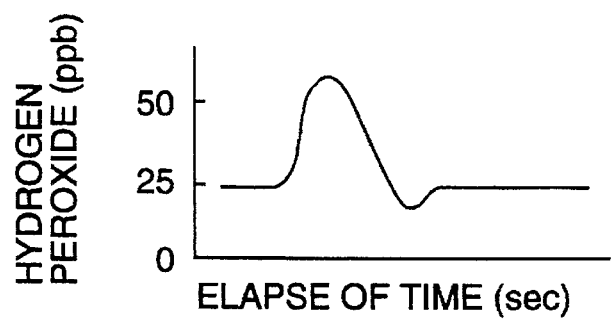
Figure 27C:
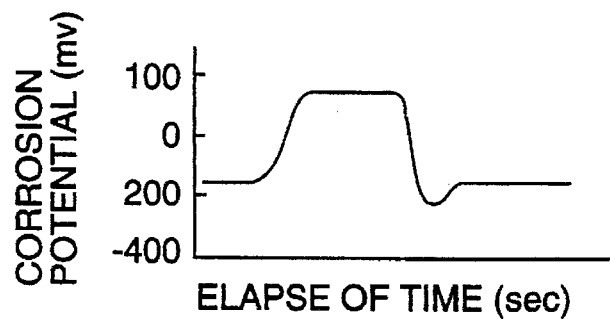
Figure 27D:
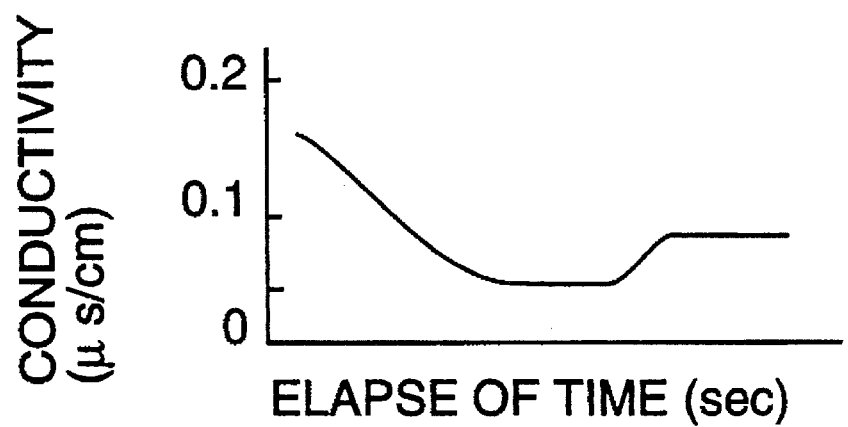
Figure 27E:
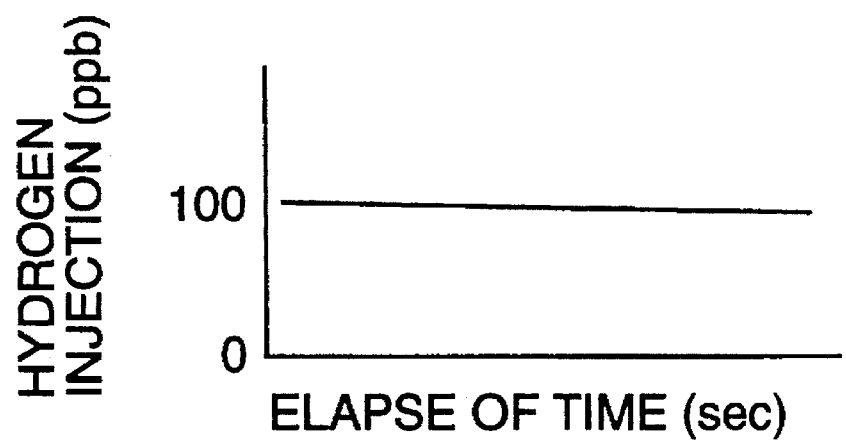

FIG. 26 illustrates a relation between F - index and the start time to stress corrosion cracking (SCC).

As a method of evaluation for reliability on the material of a component against its stress corrosion cracking, each value of F - index represents a quantitative relation between the stress corrosion cracking life and the overlapped degree of various influencing factors as an index. In FIG. 26, the slanting line portion shows a relation of F<h(t, r) and a region where a stress corrosion cracking (SCC) is generated, and the blank portion shows a relation of $F \geq h(t, r)$ and no degradation zone where no stress corrosion cracking (SCC) is generated.

No sound zone is obtained from the correlation between F - index and the environmental assisted cracking life of material.

On the other hand, in a relation of expressing the state of process of F - index of the position of component in the plant and in the case of aiming at one or more influencing factors, a variable Xj in the dimensions of the influencing factors is represented as a function of time, namely:

$$Xj(t)$$

A subdivided index Fj of the influencing factor is represented as a function of its variable Xj(t), namely:

$$Fj[Xj(t)]$$

Furthermore, defining the intrinsic index of the positions of the plant component based on the intrinsic static data of the control object described above as an intrisic index of the plant component, and the intrinsic index of the subdivided plant component as a Fzi, the overall F - index can be represented by Equation (2) in the following and the resulting F - index will be calculated.

$$F = \pi_{i=1}^{l} Fzi \times Fj[Xj(t)] \times \theta \; \pi_{\substack{i=0 \\ i \neq j}}^{n} Fi, \quad (2)$$

An environmental control operation (for example, hydrogen gas or $NO_x$ gas injection) is carried out so that each factor in this matrix of the term F - index may satisfy Equation (1) described above.

By using this system and applying the term F - index to the stress corrosion cracking test data obtained from a majority of test pieces, a relation of F - index and SCC start time is obtained on the basis of the analytical results of stress corrosion cracking life.

A constitution example of the intrinsic index Fz of the positions of the plant component described above is shown in the following. The following simple and convenient equations are introduced as follows:

$$h(x) = (1+x)/2$$

$$g(x) = (1-x)/2$$

whereas x in the equation is selected as a value of ±1 only.

a) An intrinsic index of the subdivided position of the availability of other plant field incident: $Fz_1$ $$Fz_1 = g(x)$$

if other plant field incidents are available, x=+1
if no other plant field incidents are available, x=−1

In the case that other plant field incidents are available, each value of F - index is calculated so as to become zero (0)

automatically and the check of preventive maintenance is sufficiently carried out once again while paying attention to the evaluation of the possibility for the stress corrosion cracking (SCC) by F - index.

b) An intrinsic index of the subdivided position of the availability of remedy: $Fz_2$ $$Fz_2 = g(x) \times 10^{10}$$

if other plant is remedied, x=+1 if other plant is not remedied, x=−1

In the case that other plant has its remedy history, that is, if it has not only the remedy for damage but also its remedy history for preventive maintenance, F - index is displayed on $10^{10}$ to the position in the plant component in order to make a precise check for preventive maintenance.

c) An intrinsic index of the subdivided position in the tip component of a crevice: $Fz_3$ $$Fz_3 = g(x) \times 10^{20}$$

welded component: x=+1 non welded component: x=−1

There is a difference in the influences on the stress corrosion cracking (SCC) between such crevices as shown in the cases of the tip of the crevice component at the position of the plant (one side has an opening) and that the tip is not welded and opened (each side has an opening). Therefore, if the present index is introduced to display it as $10^{20}$, then the precise computation of the term F - index is carried out, and in some cases, it is possible to let the intrinsic index of the subdivided position of the crevice: $Fz_3$ has its content including a shape of the crevice. The shape of a crevice mentioned herein means an adhesive degree at a contact time of the crevice, width of the crevice, the proportion of the opening length in the circumferential length of the crevice and others.

As shown in FIG. 26, the smaller the value of F - index, the shorter the generation of stress corrosion cracking. In other words, it means that the life of stress corrosion cracking is short and that there is a correlation between F - index and the life of stress corrosion cracking. Therefore, the slanting line portion in FIG. 26 indicates a zone having the potential of the generation of stress corrosion cracking, and on the contrary, the blank portion indicates no degradation zone. If represented by an equation, the sound zone except the slanting line zone is represented by Equation (1) described above.

Therefore, it is concluded that any plants may be operated within no degradation zone shown in FIG. 26. For example, for each point required for the prevention of stress corrosion cracking in the plant components, the values of F - index are computed every second together with the information, such as environmental data, material and stress data and the intrinsic static data of control objects and the time variations in F - index of this plant are obtained.

Let us assume that the present point is located at a point α as shown in FIG. 26. In the case of trying to prolong the life by increasing the value of F - index up to a point β from the managing aspect of stress corrosion cracking, any kinds of routes may be adopted if operated within no degradation zone from the point α to the point β.

Figure 28:
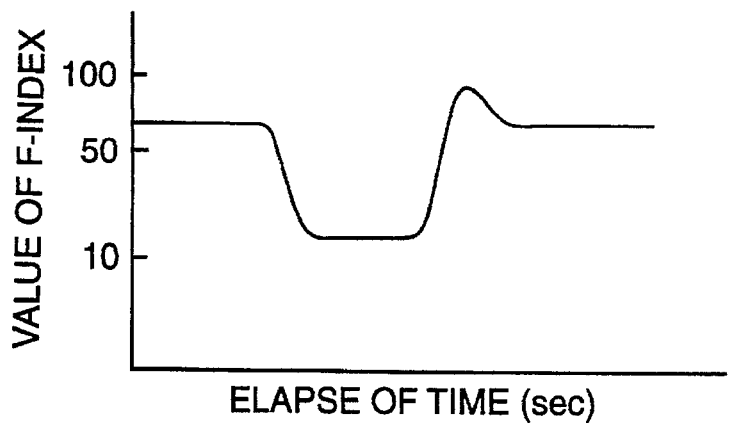
FIG. 28 is a view showing a time variation of F - index.

As shown in FIG. 28, it is better to smoothly increase F - index by gradually injecting hydrogen gas as shown in Route A as a technology for preventing an environmental assisted cracking of plant material than to trace Route B by suddenly injecting a predetermined amount of hydrogen gas from the point A, since the former can carefully proceed environmental changes while analyzing precisely the response from the plant due to hydrogen injection.

Figure 29:
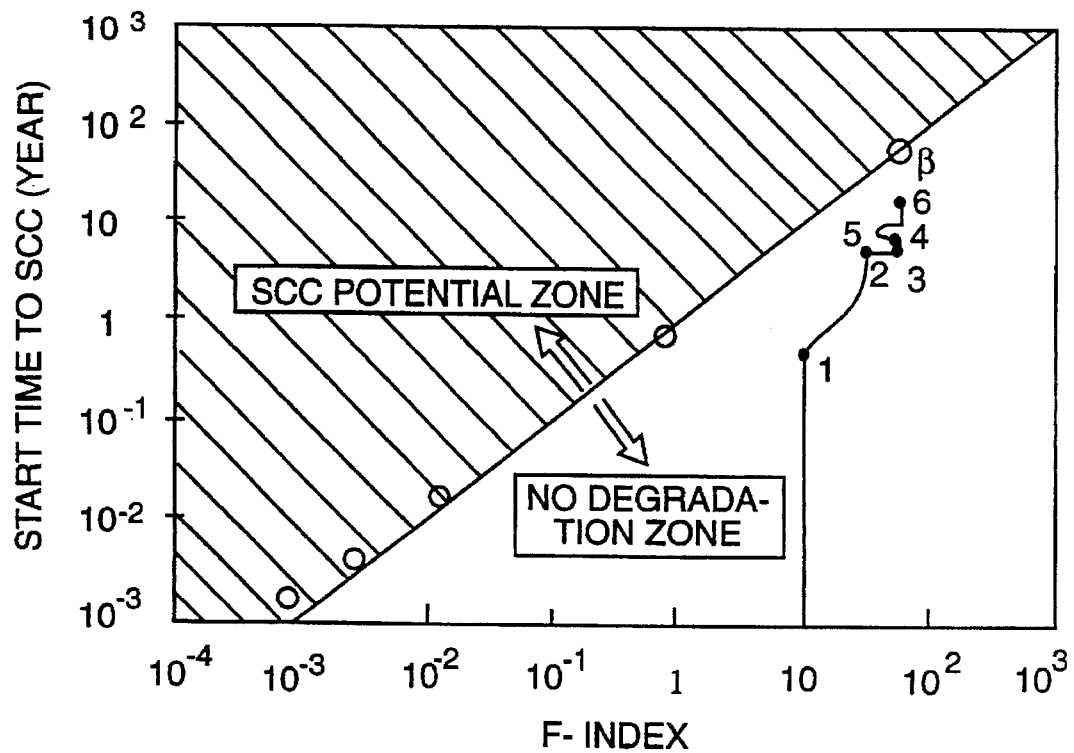
FIG. 29 is a characteristic diagram showing a relation between F - index and start time to SCC.

A method for operating a plant according to the present invention will be explained by taking an example thereof along FIGS. 27 through 29. FIGS. 27(a)–27(e) are views showing a dissolved oxygen content and a dissolved hydrogen peroxide content in reactor water, corrosion potential, time variation in conductivity and hydrogen gas injection state, respectively. FIG. 28 is a view showing a time variation of F - index values. FIG. 29 is a characteristic diagram showing a relation between F - index and start time to SCC.

FIG. 29 shows the case that the minimum value of F - index is 10 in all object points (control object points) for the prevention of stress corrosion cracking and the field incident that the plant was operated without injecting hydrogen gas for approximately one year.

Then, FIG. 29 shows the case that the values of F - index are increased from 10 up to 30 by the increase in purity of the nuclear water and the lowering in conductivity thereof as a result of remodelling the cleaning system (change from Point 1 to Point 2). Then, in order to try to prolong the life by setting Point β as a target and increase the value of F - index from 30 to 50 (increase from Point 2 to Point 3), a tiny amount of hydrogen gas is injected into the object points.

However, FIGS. 27(a)–27(e) presume the case that there were some validation of water quality under operation by maintaining the value of F - index at 50 or more. FIG. 28 shows the time variations in the values of F - index determining by environmental data, material and stress data and the intrinsic static data of a control object. When the time variation in this F - index is plotted in FIG. 29, Point 3 is converted into Point 6 sequentially through Point 4 and then Point 5. As apparent from FIG. 29, it can be understood that there is a sound zone which generates no degradation zone which cannot generate stress corrosion cracking even though there may be validation of water quality.

Therefore, while aiming at the large point having the greatest possibility of stress corrosion cracking of all the points required for the preparation of preventive maintenance for the stress corrosion cracking of the plant, the hydrogen gas injection control method in the present invention is arranged to vary the water quality so that the value of F - index at that point may be controlled and results in more actual controlling.

Furthermore, since the plant operation is combined with the control in dose on the side of the turbine, the plant operation control becomes systematized and becomes easy. Namely, according to the present invention, the plant can be operated soundly without increasing the dose on the side of turbine.

EFFECTS OF THE INVENTION

In the present invention, the reliability of the plant components and new ones can be improved by lifting up the life index of degradation as an overall of the plant components, that is: by subdividing a present technology applied to each position of the plant component to be applied to each position thereof into each influencing factor; extracting a position of the plant component which is at a lower level of technology by obtaining the life index of degradation to evaluate it; evaluating by applying various technology subdivided into each influencing factor to the position described above; and by applying and improving while applying the technology which is at a level of technology.

The technology of the present invention has an advantage in that the examinable range of technology has become broader, the evaluation can be done without running any time-consuming experiments, and any other technologies and conditions to be newly examined can be involved in order to subdivide a technology including a novel one into various influencing factors and evaluate the technology.

For the preventive maintenance of the component parts in a specific plant under operation, design or construction, it is possible to reduce the total cost for the extracting of the optimal preventive maintenance to secure the reliability on the plant, the optimal term of preparation for preventive maintenance, the automization of evaluation and the preventive maintenance of the plant component.

Furthermore, the control for the prevention of the environmental assisted cracking of material is more optimized since the plant operation control is carried out by virtue of the present index which represents the degrees in stress corrosion cracking of the material of the plant component.

We claim:

1. A system of preventive maintenance for plant component parts, which are maintained by controlling the degrees of various influencing factors on degradation at the positions thereof, comprising the steps of:

making a position of each of said plant component parts an evaluation system;

obtaining a correlation between the parameters for determining the transition probability distribution of degradation phenomena;

making the degree of influencing factor constant by aiming at an arbitrary influencing factor with respect to each of various influencing factors of said degradation phenomena;

giving the aimed arbitrary influencing factor as a variable, selecting one of the parameters for said transition probability distribution, and representing the selected parameter as a first function;

determining reference degrees of various influencing factors and setting the transition probability distribution of said degradation phenomena when the variables of various influencing factors are said reference degrees as a reference system;

knowing a value of said selected parameter for determining the transition probability distribution of the reference system;

computing a ratio between said first function and the value of said selected parameter in the reference system to give a function of the subdivided index of degradation of the aimed influencing factor;

multiplying a product of said subdivided index of degradation of various influencing factors by a unit conversion and a coefficient for reliability to define the product as an index of degradation for expressing a possibility for the generation of said phenomena;

using the correlation between the index of degradation and said selected parameter for determining the transition probability distribution of the degradation phenomena in many systems of said degradation phenomena;

determining the value of said selected parameter for determining the transition probability distribution of the degradation phenomena from the variables of the degrees of the influencing factors on the degradation phenomena in an evaluation system;

using said correlation between the parameters for determining the transition probability of said degradation phenomena;

determining the value of the other parameter in the transition probability distribution of the degradation phenomena from the value of said selected parameter for determining the transition probability distribution of the degradation phenomena in the evaluation system;

estimating the transition probability distribution of the degradation phenomena in the evaluation system; and predicting by a computational equation the possibilities of the degradation phenomena at the positions of said plant component parts to be the evaluation system.

2. A system of preventive maintenance for plant component parts according to claim 1, further comprising the steps:

making the position of the similar plant component parts to each plant component an evaluation system;

obtaining the data for determining the transition probability distribution of the degradation phenomena at said positions of the plant component parts and/or the data of the influencing factors from the inspection or field incident information of the plant component, while arranging the availability of no degradation every a specific plant component, part or position;

using together a correlation between the parameters for determining the transition probability distribution of the degradation phenomena in the case of carrying out analysis by a hazard function, in order to determine the parameters in the transition probability distribution of the degradation phenomena;

estimating the values of the parameters in transition probability distribution of the degradation phenomena;

knowing one selected parameter in the parameters of the transition probability distribution;

using the variables of the degrees of the influencing factor on the degradation at said positions of the plant component and estimating said index of degradation;

using the value of this index of degradation and said estimated parameter;

comparing the index of degradation with a correlation showing the relation between said index of degradation and said selected parameter for determining the transition probability distribution of the degradation phenomena in many systems of the degradation phenomena and confirming or improving the predicted precision in this correlation;

using the correlation for confirming or improving this precision;

determining the value of said selected parameter for determining the transition probability distribution of the degradation phenomena from the variables of the degrees of the influencing factors on the degradation phenomena in an evaluation system;

using said correlation between the parameters for determining the transition probability distribution of the degradation phenomena;

determining the value of the other parameter in the transition probability distribution of the degradation phenomena from the value of said selected parameter for determining the transition probability distribution of the degradation phenomena in the evaluation system;

estimating the transition probability distribution of the degradation phenomena in the evaluation system; and predicting the possibilities of the degradation phenomena at the positions of said plant component parts to be an evaluation system.

3. A system of preventive maintenance for plant component parts according to claim 2, further comprising the steps:

defining an index computed from the both of the hazard function of the transition probability distribution in said evaluation system and the function of the transition probability distribution of total cost of preventive maintenance as a cost index; and determining whether or not the preparation for preventive maintenance is necessary and the number of the required years of the preparation for preventive maintenance of in combination with said index of degradation and cost index.

4. A system of preventive maintenance for plant component parts according to claim 1, further comprising the steps:

making positions of said parts in a specific plant component an evaluation system;

obtaining the degrees of variable of at least one or more influencing factors on the degradation at the positions of said plant component parts by monitoring or periodically measuring;

obtaining said index of degradation by using the resulting degrees of variable;

determining the value of said selected parameters for determining the transition probability distribution of the degradation phenomena from the variables of the degrees of the influencing factors on the degradation phenomena in the evaluation system;

using the correlation between the parameters in the transition probability distribution of the degradation phenomena;

determining the value of the other parameter in the transition probability distribution of the degradation phenomena from the value of said selected parameter for determining the transition probability distribution of the degradation phenomena in the evaluation system;

estimating the transition probability distribution of the degradation phenomena in the evaluation system; and predicting the transition probability distribution of the degradation phenomena at the positions of said plant component parts to be an evaluation system.

5. A system of preventive maintenance for plant component parts according to claim 1, further comprising the steps:

arranging at least one or more data to be a basis for the analysis of the transition probability distribution of the degradation phenomena and the data on the degrees of valuable of the influencing factors from the field incident information or inspection information of the degradation at the positions of said plant components in a specific plant component;

obtaining the index of degradation by knowing the value of a variable in degrees of variable of each influencing factor of the degradation phenomena;

comparing the index of degradation with a correlation between said selected parameters for determining the transition probability distribution of the degradation phenomena in many systems of the degradation phenomena and confirming the prediction of this correlation to improve the precision in this correlation;

determining the value of said selected parameter for determining the transition probability distribution of the degradation phenomena from the variables of the degrees of the influencing factors on the degradation phenomena in an evaluation system;

using said correlation between the parameters for determining the transition probability distribution of the degradation phenomena;

determining the value of the other parameter in the transition probability distribution of the degradation phenomena from the value of said selected parameter for determining the transition probability distribution of the degradation phenomena in the evaluation system;

estimating the transition probability distribution of the degradation phenomena in the evaluation system; and predicting the transition probability distribution of the degradation phenomena at the positions of said plant component parts to be the evaluation system.

6. A system of preventive maintenance for plant component parts according to claim 1, further comprising the steps:

Obtaining a variable having each degrees of variable of various influencing factors of the degradation phenomena as a function of time from specific operation records of degradation maintenance of specific plant component parts having specific operation histories and periodical records of the operation conditions;

obtaining said index of degradation as a function of time;

displaying on a correlation of the between said index of degradation and said selected parameter for determining the transition probability distribution of the degradation phenomena in many systems of the degradation phenomena;

determining the value of said selected parameters for determining the transition probability distribution of the degradation phenomena from the variables of the degrees of the influencing factors on the degradation phenomena in the evaluation system;

using said correlation between the parameters in the transition probability distribution of the degradation phenomena;

determining the value of the other parameter in the transition probability distribution of the degradation phenomena from the value of said selected parameter for determining the transition probability distribution of the degradation phenomena in the evaluation system;

estimating the transition probability distribution of the degradation phenomena in the evaluation system; and computing the transition probability distribution of the degradation phenomena at the positions of said plant component parts to be the evaluation system.

7. A system of preventive maintenance for plant component parts according to claim 1, further comprising the steps:

subdividing a technology of present application into each influencing factor on degradation with respect to each position of the plant component parts and inputting the value of said technology of present application and the value of a reference technology into each influencing factor thus subdivided;

obtaining the subdivided index of each influencing factor in the technology of present application on the basis of the value of the input reference technology;

computing individually the life index value of degradation due to a product of the subdivided index with respect to each position;

comparing the life index value of degradation at each position of the plant component with a predetermined value and extracting and outputting each position of the plant components showing the smaller value of the index of degradation than the predetermined value;

Inputting each technology subdivided into each influencing factor with respect to each extracted position of the plant component parts, said each influencing factor in various technologies being used for obtaining each subdivided index, obtaining the life index value of degradation at each position of the plant component by the product of said subdivided index, said life index value of degradation at each position of the plant component being compared with a predetermined value, and selecting a technology of improvement for adopting the life index value of degradation exceeding the predetermined value; and obtaining an optimal technology to output taking the selected technology test of improvement into consideration.

8. A system of preventive maintenance for plant component parts according to in claim 1, comprising the following means:

an analytical means of technology for subdividing a technology of present application into each influencing factor on degradation with respect to each position of said plant component;

an input means for inputting the values of said technology of present application and the values of a reference technology with respect to each subdivided influencing factor;

a computational means of life index of degradation for calculating the subdivided index with respect to each influencing factor of the technology of present application on the basis of the value of the reference technology by said input means and determining the life index of degradation by a product of said subdivided index with respect to each position of said plant component;

a discrimination means of present technology for comparing the life index value at each position of said plant component from said computational means of life index of degradation with a predetermined value and extracting the position of said plant component showing a smaller life index value of degradation than the predetermined value;

a discrimination means of technology of improvement for inputting various subdivided technologies into each influencing factor by said input means with respect to each position of the plant component extracted by said discrimination means of present technology, calculating a subdivided index using each influencing factor of said various technologies, determining the life index of degradation of each position of the plant component by a product of said subdivided index, comparing said life index value at each position of said plant component with a predetermined value, and selecting a technology of improvement for taking the life index value exceeding the predetermined value;

an evaluation means of optimal technology for obtaining an optimal technology taking cost to the selected technology of improvement by said discrimination means of technology of improvement into consideration; and an output means for outputting the results of said discrimination means of present technology and the results of said evaluation means of optimal technology.

9. A plant operation control method for preventing the corrosion degradation of plant component parts, which uses said index of degradation determined in claim 1, comprising the steps:

obtaining a no-degradation zone from a correlation between the life index of degradation and the environmental assisted cracking life as follows:

$$F \geq h(t, r) \quad (1)$$

wherein,

F: the life index of degradation t: time r: level of reliability and b: function;

expressing a variable $X_j$ in dimensions of an influencing factor as a function of operation time or service time of the plant, in the case of marking at least one or more influencing factors in a relation of representing the state of process of the index of said positions of plant component parts;

expressing a subdivided index $F_j$ of said influencing factor j as a function of $X_j(t)$ thereof;

representing total index by the following Equation (2) to compute the resulting index:

$$F = \prod_{i=1}^{l} F_{zi} \times F_j[X_j(t)] \times \theta \prod_{\substack{i=0 \\ i \neq j}}^{n} F_i, \quad (2)$$

wherein the index characteristic of the position of a plant component which is based on intrinsic static data of said control object is defined as an intrinsic index of the plant component, and the subdivided intrinsic index of the plant component is defined as a $F_{zi}$; and running an environmental control operation such that each factor in the matrix of the index satisfies Equation (1).

* * * * *